United States Patent
Hiasa

(10) Patent No.: US 12,505,517 B2
(45) Date of Patent: *Dec. 23, 2025

(54) IMAGE PROCESSING METHOD, IMAGE PROCESSING APPARATUS, IMAGE PROCESSING SYSTEM, AND MANUFACTURING METHOD OF LEARNT WEIGHT

(71) Applicant: CANON KABUSHIKI KAISHA, Tokyo (JP)

(72) Inventor: Norihito Hiasa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/320,332

(22) Filed: May 19, 2023

(65) Prior Publication Data

US 2023/0289927 A1 Sep. 14, 2023

Related U.S. Application Data

(63) Continuation of application No. 16/891,406, filed on Jun. 3, 2020, now Pat. No. 11,694,310.

(30) Foreign Application Priority Data

Jun. 6, 2019 (JP) .................. 2019-105850

(51) Int. Cl.
*G06T 5/73* (2024.01)
*G06N 3/084* (2023.01)
(Continued)

(52) U.S. Cl.
CPC ............... *G06T 5/73* (2024.01); *G06N 3/084* (2013.01); *G06N 20/00* (2019.01); *G06T 5/20* (2013.01);
(Continued)

(58) Field of Classification Search
None
See application file for complete search history.

(56) References Cited

U.S. PATENT DOCUMENTS 8,798,389 B2   8/2014   Hatakeyama
9,865,039 B2   1/2018   Naruse
(Continued)

FOREIGN PATENT DOCUMENTS

CN   101387734 A   3/2009
CN   102256056 A   11/2011
(Continued)

OTHER PUBLICATIONS

Office Action issued in Japanese Appln. No. 2019-105850 mailed on Dec. 22, 2020. English translation provided.
(Continued)

*Primary Examiner* — Leon Viet Q Nguyen
(74) *Attorney, Agent, or Firm* — ROSSI, KIMMS & McDOWELL LLP

(57) ABSTRACT

An image processing method includes a first step of acquiring input data including a captured image and optical system information relating to a state of an optical system used for capturing the captured image and a second step of inputting the input data to a machine learning model and of generating an estimated image acquired by sharpening the captured image or by reshaping blurs included in the captured image.

24 Claims, 14 Drawing Sheets

(51) Int. Cl.
   *G06N 20/00* (2019.01)
   *G06T 5/20* (2006.01)
(52) U.S. Cl.
   CPC .............. *G06T 2207/20081* (2013.01); *G06T 2207/20084* (2013.01); *G06T 2207/20172* (2013.01)

(56) References Cited

U.S. PATENT DOCUMENTS

| | | | |
|---|---|---|---|
| 10,223,601 B1* | 3/2019 | Huang | G06F 18/24 |
| 10,659,661 B2 | 5/2020 | Oniki | |
| 10,861,194 B2 | 12/2020 | Omori | |
| 11,380,347 B2* | 7/2022 | Bharitkar | G10L 21/0316 |
| 11,694,310 B2* | 7/2023 | Hiasa | G06T 5/20 |
| | | | 382/100 |
| 2003/0147102 A1 | 8/2003 | Lee | |
| 2009/0074393 A1 | 3/2009 | Park et al. | |
| 2011/0205402 A1 | 8/2011 | Kumar | |
| 2011/0279699 A1 | 11/2011 | Matsui | |
| 2016/0110851 A1 | 4/2016 | Oniki et al. | |
| 2018/0061020 A1* | 3/2018 | Hiasa | G06T 3/60 |
| 2018/0158175 A1* | 6/2018 | Shmunk | G06T 5/92 |
| 2019/0147331 A1* | 5/2019 | Arditi | G06V 20/58 |
| | | | 706/20 |
| 2019/0340788 A1 | 11/2019 | Naruse | |
| 2020/0364878 A1* | 11/2020 | Bradski | G06N 3/084 |
| 2020/0388011 A1* | 12/2020 | Nair | G06N 3/045 |

FOREIGN PATENT DOCUMENTS

| | | | |
|---|---|---|---|
| CN | 105530407 A | 4/2016 | |
| CN | 109644230 A | 4/2019 | |
| JP | 2011123589 A | 6/2011 | |
| JP | 2015103902 A | 6/2015 | |
| JP | 2016082579 A | 5/2016 | |
| JP | 2017123532 A | 7/2017 | |
| JP | 2017199235 A | 11/2017 | |
| JP | 2018055516 A | 4/2018 | |
| JP | 2018082239 A | 5/2018 | |
| JP | 2018180733 A | 11/2018 | |
| JP | 2019016275 A | 1/2019 | |
| JP | 2019075716 A | 5/2019 | |
| WO | 2014148074 A1 | 9/2014 | |
| WO | 2018037521 A1 | 3/2018 | |
| WO | 2018102302 A1 | 6/2018 | |
| WO | 2018150695 A1 | 8/2018 | |

OTHER PUBLICATIONS

Office Action issued in Japanese Appln. No. 2019-105850 mailed May 11, 2021. English translation provided.
Sakurikar "RefocusGAN: Scene Refocusing Using a Single Image" European Conference on Computer Vision (ECCV). 2018: pp. 519-535.
Gombru "Concatenate layer output with additional input data" PyTorch. Jun. 2018: pp. 1-8. URL:https://discuss.pytorch.org/t/concatenate-layer-output-with-additional-input-data/20462.
Extended European Search Report issued in European Appln. No. 20177776.0 mailed on Jan. 29, 2021.
Non-Final Office Action issued in U.S. Appl. No. 16/891,406 mailed Mar. 17, 2022.
Final Office Action issued in U.S. Appl. No. 16/891,406 mailed Jul. 5, 2022.
Non-Final Office Action issued in U.S. Appl. No. 16/891,406 mailed Oct. 14, 2022.
Notice of Allowance issued in U.S. Appl. No. 16/891,406 mailed Mar. 3, 2023.
Parikshit Sakurikar et al., "Defocus Magnification using Conditional Adversarial Networks", 2019 IEEE Winter Conference on Applications of Computer Vision, 2019, pp. 1337-1346.
Office Action issued in Chinese Appln. No. 202010487417.0, mailed Mar. 27, 2024. English translation provided.
Office Action issued in Chinese Appln. No. 202010487417.0 mailed on Aug. 12, 2025.

* cited by examiner

IMAGE PROCESSING METHOD, IMAGE PROCESSING APPARATUS, IMAGE PROCESSING SYSTEM, AND MANUFACTURING METHOD OF LEARNT WEIGHT

BACKGROUND OF THE INVENTION

Field of the Invention

The present invention relates to an image processing method for sharpening or reshaping blurs caused by an optical system used for capturing a captured image.

Description of the Related Art

Japanese Patent Laid-Open No. ("JP") 2011-123589 discloses a method of correcting blurs caused by an aberration in a captured image using processing based on a Wiener filter and of acquiring a sharpened image. JP 2017-199235 discloses a method of correcting blurs caused by defocus in a captured image using a convolutional neural network (CNN).

However, the method disclosed in JP 2011-123589 uses the processing based on the Wiener filter (linear processing), and thus cannot sharpen a blurred image with high accuracy. For example, it is impossible to restore information on an object in which the blurs make a spatial frequency spectrum zero, or makes an intensity of the object same as that of a noise. Further, since it is necessary to use different Wiener filters for different aberrations, an amount of stored data for sharpening the captured image (the data capacity indicating a plurality of Wiener filters) increases in an optical system that generates various aberrations.

On the other hand, in JP 2017-199235, since the method using the CNN is nonlinear processing, it is possible to estimate the spatial frequency spectrum of the object that has reduced to in the vicinity of zero. However, the method using the CNN may reduce the sharpening accuracy, or may increase a learning load and the amount of the stored data when sharpening the captured image captured by the optical system that generates various aberrations. The CNN may not correctly sharpen the image having the blurs which the CNN has not learnt. In the optical system, the generated blurs vary due to states of a zoom, F-number, object distance (focus distance), and the like, and the following two methods are conceivable to sharpen the images of all the blurs.

A first method makes the CNN learn using learning data including all the blurs that may occur in the optical system. However, in the first method, since the CNN learns so as to average all the blurs included in the learning data, the respective sharpening accuracy decreases in each blur having a different shape. A second method divides the blurs that may occur in the optical system into a plurality of similar groups, and makes the CNN individually learn based on the learning data of each group. However, in the second method, when the optical system is, for example, a high-magnification zoom lens and generates various aberrations, the number of groups largely increases, increasing the learning load and the amount of stored data (the data capacity of the learnt CNN weight). Thus, it is difficult to ensure the accuracy in sharpening the blurred image while the learning load and the amount of stored data are suppressed.

SUMMARY OF THE INVENTION

The present invention provides an image processing method, an image processing apparatus, an image processing system, and a manufacturing method of learnt weight each of which highly accurately sharpens a captured image or reshapes blurs in the captured image while suppressing a learning load and an amount of stored data of a machine learning model.

An image processing method according to one aspect of the present invention includes a first step of acquiring input data including a captured image and optical system information relating to a state of an optical system used for capturing the captured image, and a second step of inputting the input data to a machine learning model and of generating an estimated image acquired by sharpening the captured image or by reshaping blurs included in the captured image.

A storage medium storing a computer program that causes a computer to execute above image processing method also constitutes another aspect of the present invention.

An image processing apparatus as one aspect of the present invention includes at least one processor or circuit configured to execute a plurality of tasks of an acquiring task configured to acquire input data including a captured image and optical system information relating to a state of an optical system used for capturing the captured image, and a generating task configured to input the input data to a machine learning model and of generating an estimated image acquired by sharpening the captured image or by reshaping blurs included in the captured image.

An image processing system as one aspect of the present invention has a first apparatus and a second apparatus. The first apparatus includes at least one processor or circuit configured to execute a transmitting task configured to transmit, to the second apparatus, a request relating to an execution of processing on a captured image, and the second apparatus includes at least one processor or circuit configured to execute a plurality of tasks of a receiving task configured to receive the request, an acquiring task configured to acquire input data including the captured image and optical system information relating to a state of an optical system used for capturing the captured image, and a generating task configured to input the input data to a machine learning model and of generating an estimated image acquired by sharpening the captured image or by reshaping blurs included in the captured image.

An image processing method as one aspect of the present invention includes a first step of acquiring input data including a training image and optical system information relating to a state of an optical system corresponding to the training image, a second step of inputting the input data to a machine learning model and generating an output image acquired by sharpening the training image or by reshaping blurs included in the training image, and a third step of updating a weight of the machine learning model based on the output image and a ground truth image.

A storage medium storing a computer program that causes a computer to execute the above described image processing method also constitutes another aspect of the present invention.

A manufacturing method of learnt weight as one aspect of the present invention includes a first step of acquiring input data including a training image and optical system information relating to a state of an optical system corresponding to the training image, a second step of inputting the input data to a machine learning model and generating an output image acquired by sharpening the training image or by reshaping blurs included in the training image, and a third step of updating a weight of the machine learning model based on the output image and a ground truth image.

An image processing apparatus as one aspect of the present invention includes at least one processor or circuit configured to execute a plurality of tasks of an acquiring task configured to acquire input data including a training image and optical system information relating to a state of an optical system corresponding to the training image, a generating task configured to input the input data to a machine learning model and generating an output image acquired by sharpening the training image or by reshaping blurs included in the training image, and an updating task configured to update a weight of the machine learning model based on the output image and a ground truth image.

Further features of the present invention will become apparent from the following description of exemplary embodiments with reference to the attached drawings.

DESCRIPTION OF THE EMBODIMENTS

Figure 1:
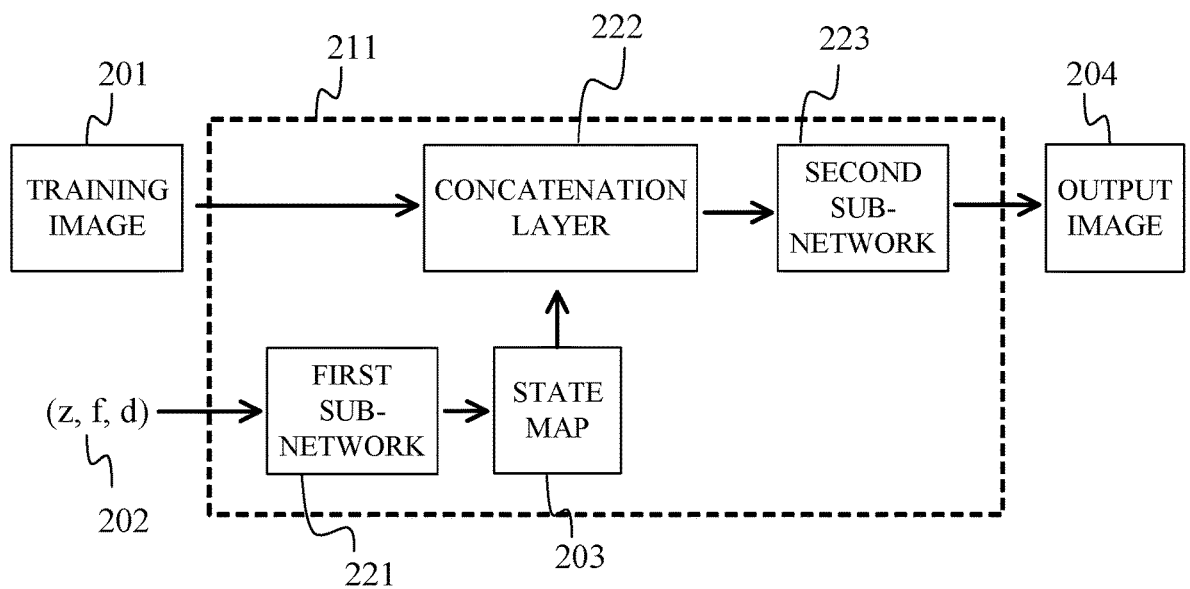
FIG. 1 is a configuration diagram illustrating a machine learning model according to a first embodiment.

Referring now to the accompanying drawings, a detailed description will be given of embodiments according to the present invention. Corresponding elements in respective figures will be designated by the same reference numerals, and a duplicate description thereof will be omitted.

Before a specific description is given of each embodiment, the gist of the present invention will be described. The present invention uses a machine learning model to sharpen a captured image or reshape blurs in the captured image. An optical system is used for capturing the image and causes the blurs (generates the blurs). The term "optical system" as used herein refers to those that have an optical effect on image-capturing. That is, the "optical system" includes not only the imaging optical system but also, for example, an optical low-pass filter and a microlens array of an image sensor. Thus, the blurs caused by the optical system includes the blurs caused by an aberration, diffraction, and defocus, an action by the optical low-pass filter, a pixel aperture deterioration of an image sensor, and the like.

The machine learning model includes, for example, a neural network, genetic programming, a Bayesian network, and the like. The neural network includes a CNN (Convolutional Neural Network), a GAN (Generative Adversarial Network), an RNN (Recent Neural Network), and the like.

Sharpening refers to processing for restoring frequency components of an object that have been reduced or lost due to the blurs. Reshaping refers to conversion of blur shapes without restoring the frequency components. For example, the reshaping includes conversion from two-line blur to Gaussian or disk (flat circular distribution), conversion from defocus blur with vignetting to circular defocus blur, and the like.

The input data input to the machine learning model includes a captured image and information relating to a state of the optical system at the time of capturing the captured image (referred to as optical system information hereinafter). The state of the optical system refers to the state of the apparatus that may vary an optical action relating to the image-capturing. The state of the optical system includes, for example, states of a zoom, F-number, object distance, and the like of the optical system. The optical system information may include information on presence or absence of the optical low-pass filter (or type of the optical low-pass filter) and presence or absence (or type) of an accessory (for example, a converter lens) attached to the optical system.

The optical system information is input to the machine learning model during learning and during the estimation after the learning so that the machine learning model can determine which state of the optical system causes the blurs in the captured image. Thereby, even when an image to be learnt includes various shapes of blur, the machine learning model can learn a weight for sharpening the image (or reshape the blurs) for each state of the optical system, instead of learning a weight for evenly sharpening the image (or for reshaping the blurs).

Accordingly, the present invention can perform highly accurate sharpening (or reshaping) on the image having each blur. Further, it is possible to collectively learn the learning data including blurs of various shapes while a decrease in accuracy of sharpening the captured image (or reshaping the blurs) is suppressed. Thus, the present invention can sharpen the captured image or reshape the blurs on the captured image having the blurs caused by the optical system with high accuracy while the learning load and the amount of the stored data are suppressed. The effect of the present invention will be quantitatively described in the second embodiment. In the following description, a learning phase refers to the step of the weight learning in the machine learning model, and an estimating phase refers to the step of sharpening the captured image or reshaping the blurs using the learnt weight in the machine learning model.

First Embodiment

First, a description will be given of an image processing system according to a first embodiment of the present invention. This embodiment sharpens the captured image, but the present invention is similarly applicable to the reshaping of the blurs. This embodiment describes the sharpening on the images having the blurs caused by the aberration and diffraction, but the present invention may be applied to the images having the blurs caused by the defocus.

Figure 2:
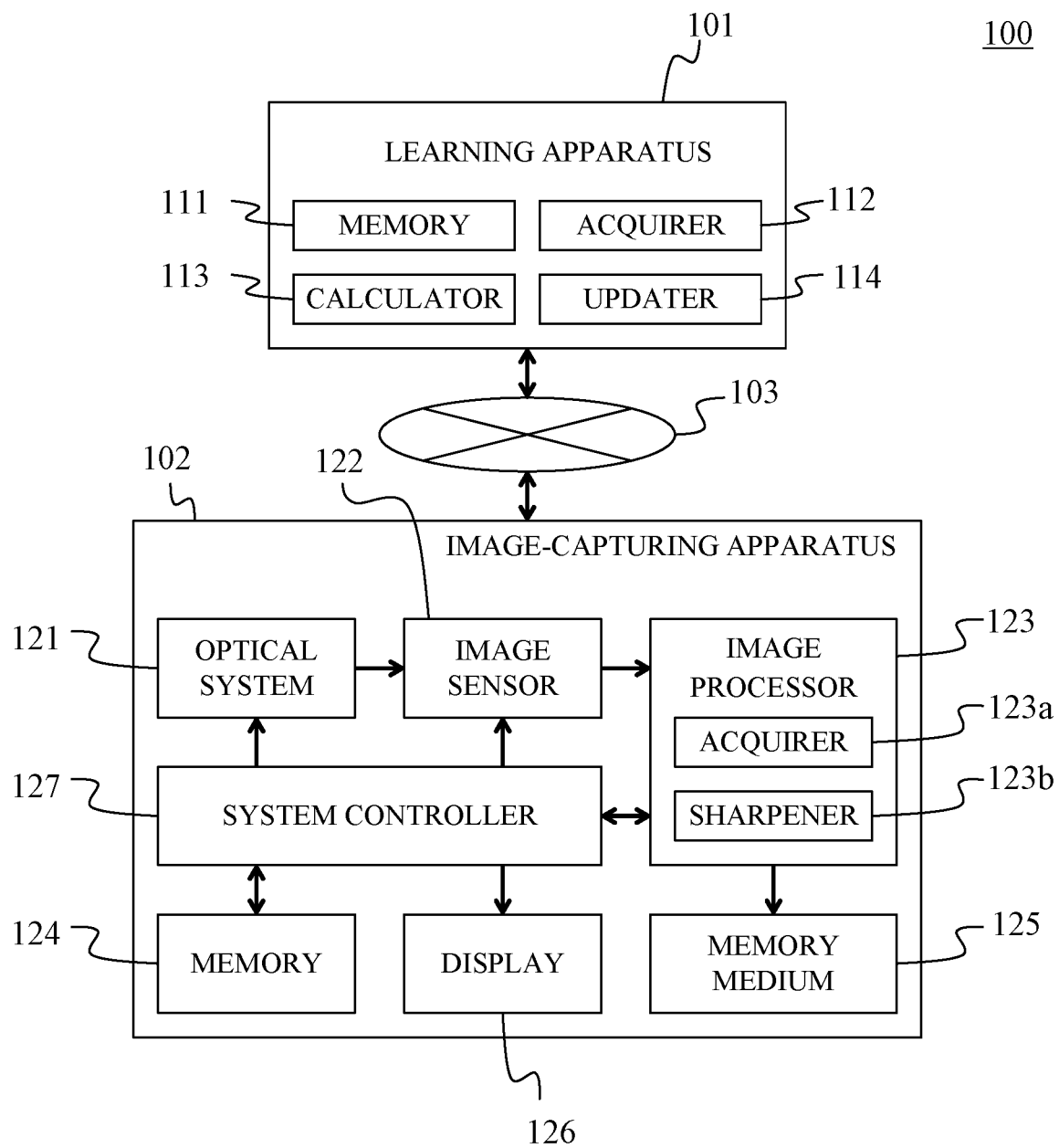
FIG. 2 is a block diagram illustrating an image processing system according to the first embodiment.
Figure 3:
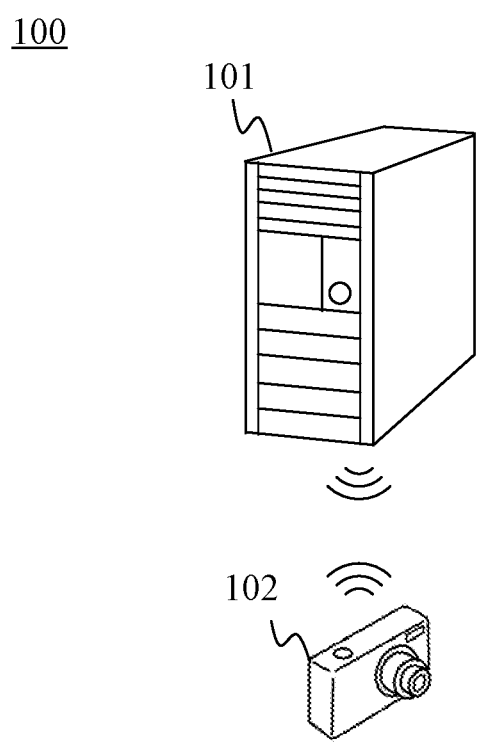
FIG. 3 is an external view illustrating the image processing system according to the first embodiment.

FIG. 2 is a block diagram illustrating an image processing system 100 in this embodiment. FIG. 3 is an external view illustrating the image processing system 100. The image processing system 100 includes a learning apparatus (image processing apparatus) 101, an image-capturing apparatus 102, and a network 103. The learning apparatus 101 and the image-capturing apparatus 102 are wired or wirelessly connected via the network 103. The learning apparatus 101 includes a memory 111, an acquirer (acquiring unit) 112, a calculator (generating unit) 113, and an updater (updating unit) 114, and is configured to learn the weight for sharpening the captured image in the machine learning model. The image-capturing apparatus 102 is configured to acquire the captured image by capturing an object space, and to sharpen the captured image having the blurs by using information on the weight read out after or before the image-capturing. A detailed description will be given later of the weight learning in the learning apparatus 101 and the sharpening of the captured image in the image-capturing apparatus 102.

The image-capturing apparatus 102 includes an optical system (imaging optical system) 121 and an image sensor 122. The optical system 121 collects light that has entered the image-capturing apparatus 102 from the object space. The image sensor 122 receives (electrically converts) an optical image (object image) formed via the optical system 121 and generates the captured image. The image sensor 122 is, for example, a CCD (Charge Coupled Device) sensor or a CMOS (Complementary Metal-Oxide Semiconductor) sensor.

An image processor (image processing apparatus) 123 includes an acquirer (acquiring unit) 123a and a sharpener (generating unit) 123b, and is configured to generate, by sharpening the captured image, an estimated image (sharpened image) from the captured image. The estimated image is generated using the information on the learnt weight learnt by the learning apparatus 101. The weight information has been read in advance from the learning apparatus 101 via the wired or wireless network 103 and stored on the memory 124. The stored weight information may be a numerical value of the weight itself or an encoded form of that. A recording medium 125 is configured to store the estimated image. Alternatively, the captured image may be stored on the recording medium 125, and the image processor 123 may read the captured image to generate the estimated image. A display 126 is configured to display the estimated image stored on the recording medium 125 in accordance with a user's instruction. A system controller 127 is configured to control the series of the operation described above.

Figure 4:
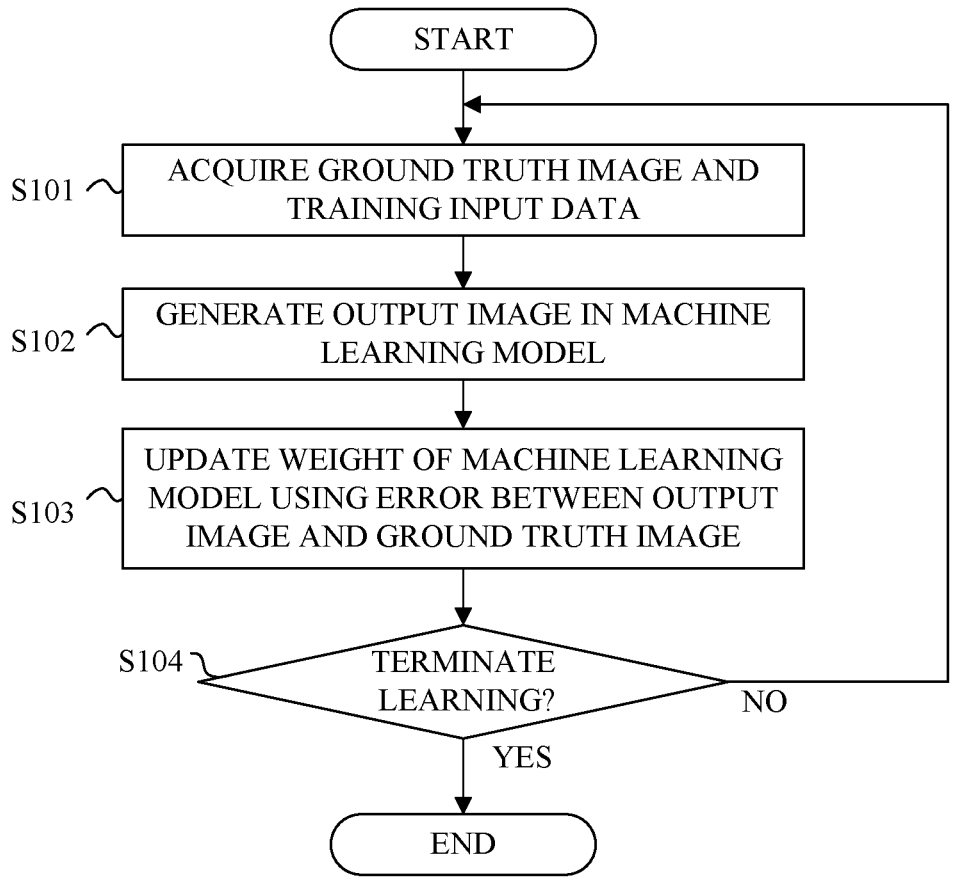
FIG. 4 is a flowchart relating to weight learning according to the first and second embodiments.

Next, a description will be given of the weight learning (learning phase, a method of manufacturing a learnt model) executed by the learning apparatus 101 in this embodiment with reference to FIG. 4. FIG. 4 is a flowchart relating to the weight learning. Each step of FIG. 4 is mainly executed by the acquirer 112, the calculator 113, or the updater 114 in the learning apparatus 101. In this embodiment, the CNN is used as the machine learning model, but the present invention may be similarly applied to other models.

First, in the step S101, the acquirer 112 acquires one or more sets of a ground truth image and training input data from the memory 111. The training input data is input data for the learning phase of the CNN. The training input data includes a training image and optical system information corresponding to that of the training image (referred to as training optical system information hereinafter). The training image and the ground truth image are a pair of images that include the same object and are different in the presence or absence of the blurs. The ground truth image does not include the blurs, and the training image includes the blurs. The blurs are generated by combining the aberration and diffraction caused by the optical system 121 and a pixel aperture deterioration of the image sensor 122. One training image includes the blurs generated by combining the aberration and diffraction caused by the optical system 121 having specific states of the zoom, F-number, and focal length and the pixel aperture deterioration. The training optical system information is information indicating at least one of the specific states of the zoom, F-number, and focal length. In other words, the optical system information is information that specifies the blurs included in the training image. In this embodiment, the optical system information includes all of the states of the zoom, F-number, and focal length. The training image is not limited to the captured image, and may be an image generated by CG or the like.

The following is an example of a method for generating the ground truth image and the training input data stored on the memory 111. The first generating method is performing an image-capturing simulation using an original image as the object. The original image is an image captured real world, a CG (Computer Graphics) image, or the like. The original image may include edges having various intensities and directions, textures, gradations, flat portions, and the like so that various objects can be correctly sharpened. One or more original images may be used. The ground truth image is acquired by performing the image-capturing simulation on the original image to which the blurs are not applied. The training image is acquired by performing the image-capturing simulation on the original image to which the blurs to be learnt are applied (blurring).

This embodiment uses the blurs generated by the aberration and diffraction generated in a state (Z, F, D) of the optical system 121 and the pixel aperture deterioration. Here, Z, F, and D represent the states of the zoom, F-number, and object distance, respectively. When the image sensor 122 acquires a plurality of color components, the blurs of each color component is applied to the original image. The blur can be applied by convolving the original image with a Point Spread Function (PSF) or by multiplying a frequency characteristic of the original image and the OTF (Optical Transfer Function). When the blurs in the state (Z, F, D) is applied to the training image, the training optical system information is information for specifying (Z, F, D). The ground truth image and the training image may be an undeveloped RAW image or a developed image. The blurs of a plurality of different (Z, F, D) are applied to one or more original images to generate the plurality of sets of the ground truth image and the training image.

This embodiment collectively learns correction for all the blurs generated in the optical system 121. Thus, the plurality of sets of the ground truth image and the training image are generated for all the possible (Z, F, D) of the optical system 121. Because the plurality of blurs may occur in the same (Z, F, D) depending on the image height and the azimuth, the set of the ground truth image and the training image is generated for each different image height and azimuth.

The original image may have a signal value higher than a luminance saturation value of the image sensor 122. This is because, when an actual object is captured by the image-capturing apparatus 102 under a specific exposure condition, the luminance may not fall within the luminance saturation value. The ground truth image is generated by clipping the signals with the luminance saturation value of the image sensor 122. The training image is generated by applying the blurs and then clipping the signals with the luminance saturation value.

When the ground truth image and the training image are generated, the size of the original image may be reduced (reduction). When the real image is used as an original image, the blurs have already occurred due to the aberration or diffraction. The size of the original image is reduced for suppressing the influence of the blurs in the original image and generating the ground truth image with high resolution. In this case, the size of the training image is also reduced in order to match the scale with the ground truth image. Either the reduction or the blurring may be performed first for generating the training image. When the blurring is performed first, it is necessary to reduce a sampling rate of the blurs in consideration of the reduction. In the case of PSF, the sampling points in the space may be made finer, and in the case of OTF, a maximum frequency may be made larger. When the original image contains sufficient high frequency components, the highly accurate sharpening can be performed on the original image without the reduction, and thus the reduction is not necessarily performed.

In the generation of the training image, the blurs to be applied do not include a distortion. If the distortion is large, the position of the object changes, and the objects in the image may differ in the ground truth image and the training image. Thus, the CNN made to learn in this embodiment does not correct the distortion. The estimating phase corrects the distortion after sharpening the captured image using the bilinear interpolation, bicubic interpolation, or the like. Similarly, the blurs to be applied do not include a chromatic aberration of magnification in the generation of the training image. By using a shift of each color component, the estimating phase corrects the chromatic aberration of magnification before sharpening the captured image.

A second generating method of the ground truth image and the training input data is a method using the real image captured by the optical system 121 and the image sensor 122. The optical system 121 captures the image in the state of (Z, F, D) to acquire the training image. The training optical system information is information for specifying (Z, F, D). The ground truth image is acquired, for example, by capturing the same object as that of the training image using an optical system having higher performance than the optical system 121. A partial area may be extracted for a predetermined number of pixels in the training image and the ground truth image generated in the above two methods, and may be used for learning.

Subsequently, in the step S102 of FIG. 4, the calculator 113 inputs the training input data to the CNN and generates an output image. A description will be given for the generation of the output image in this embodiment with reference to FIG. 1. FIG. 1 is a configuration diagram illustrating the machine learning model in this embodiment.

The training input data includes a training image 201 and optical system information (z, f, d) 202. The training image 201 may be gray scale or have a plurality of channel components. The same applies for the ground truth image. (z, f, d) is the normalized (Z, F, D). The normalization is performed based on the possible range of the optical system 121 for each of zoom, F-number, and object distance. For example, Z represents a focal length, F represents an aperture value (f-number), and D represents a reciprocal of the absolute value of a distance from the image-capturing apparatus 102 to an in-focus object. $Z_{min}$ and $Z_{max}$ are the minimum value and the maximum value of the focal length of the optical system 121, $F_{min}$ and $F_{max}$ are the minimum value and the maximum value of the aperture value, and $D_{min}$ and $D_{max}$ are the minimum value and the maximum value of the reciprocal of the absolute value of the focusable distance. When the maximum focusable distance is infinity, $D_{min}=1/|\infty|=0$. The normalized (z, f, d) is acquired by the following expression (1).

$$x = \frac{X - X_{min}}{X_{max} - X_{min}}, (x = \{z, f, d\}, X = \{Z, F, D\}) \quad (1)$$

In the expression (1), x and X are dummy variables indicating any one of (z, f, d) and any one of (Z, F, D), respectively. In a case of $X_{min}=X_{max}$, x is a constant. Alternatively, in the case of $X_{min}=X_{max}$, since the x has no degree of freedom, x may be excluded from optical system information. In general, the closer the object distance is, the larger a performance variation of the optical system 121 becomes. Thus, D is the reciprocal of distance.

In this embodiment, a CNN 211 has a first sub-network 221 and a second sub-network 223. The first sub-network 221 has one or more convolutional layers or a fully connected layer. The second sub-network 223 has one or more convolutional layers. At the first time of the learning, the weight of the CNN 211 (each element of filter and a value of bias) is generated by a random number. The first sub-network 221 receives the optical system information (z, f, d) 202 as an input and generates a state map 203 converted into a feature map. The state map 203 is a map indicating the state of the optical system, and has the same number of elements (number of pixels) as that of one channel component of the training image 201. A concatenation layer 222 concatenates the training image 201 and the state map 203 in a predetermined order in a channel direction. Other data may be concatenated between the training image 201 and the state map 203. The second sub-network 223 uses the concatenated training image 201 and the state map 203 as input, and generates an output image 204. When the plurality of the sets of the training input data are acquired in the step S101 of FIG. 4, the output image 204 is generated for each set. The training image 201 may be converted into the feature map by a third sub-network, and the feature map and the state map 203 may be concatenated by the concatenation layer 222.

Subsequently, in the step S103 of FIG. 4, the updater 114 updates the weight of the CNN from the error between the output image and the ground truth image. This embodiment uses, as a loss function, a Euclidean norm of a difference between the signal values of the output image and the ground truth image. However, the loss function is not limited to this. When the plurality of sets of the training input data and the ground truth image are acquired in the step S101, the value of the loss function is calculated for each set. The weight is updated by a backpropagation or the like using the calculated value of the loss function.

Subsequently in the step S104, the updater 114 determines whether the weight learning has been completed. The completion can be determined based on whether a number of iterations of learning (weight update) has reached a predetermined number, whether a weight variation amount at the time of updating is smaller than a predetermined value, or the like. When, in the step S104, it is determined that the weight learning has not been completed, the process returns to the step S101, and the acquirer 112 acquires one or more new sets of the training input data and the ground truth image. On the other hand, when it is determined that the weight learning has been completed, the updater 114 terminates the learning and stores the weight information in the memory 111.

Figure 5:
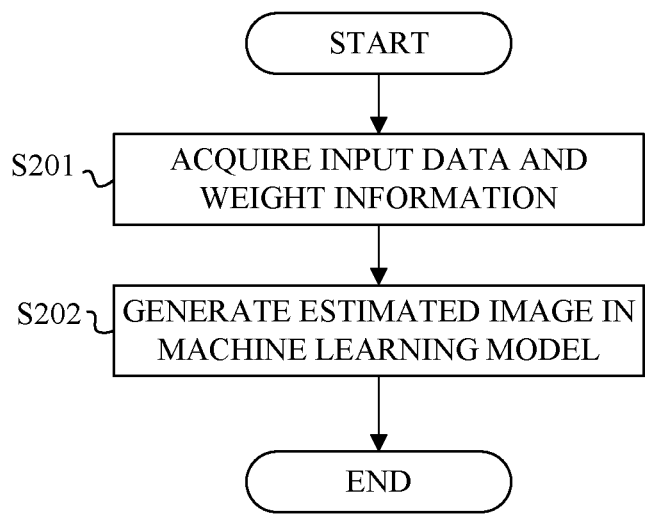
FIG. 5 is a flowchart relating to a generation of an estimated image according to the first embodiment.

Next, a description will be given of the sharpening of the captured image (estimating phase) executed by the image processor 123 in this embodiment, with reference to FIG. 5. FIG. 5 is a flowchart relating to the sharpening of the captured image (generation of the estimated image) in this embodiment. Each step in FIG. 5 is mainly executed by the acquirer 123a or the sharpener 123b in the image processor 123.

First, in the step S201, the acquirer 123a acquires the input data and the weight information. The input data includes the captured image and the optical system information of the optical system 121 capturing the captured image. The captured image to be acquired may be part of the entire captured image. The optical system information is (z, f, d) indicating the states of the zoom, F-number, and object distance of the optical system 121. The weight information is read out and acquired from the memory 124.

Subsequently in the step S202, the sharpener 123b inputs the input data to the CNN and generates the estimated image. The estimated image is acquired by sharpening the captured image having the blurs caused by the aberration and diffraction of the optical system 121 and the pixel aperture deterioration of the image sensor 122. The estimated image is generated using the CNN illustrated in FIG. 1, in the same manner as that of the learning. The acquired learnt weight is used for the CNN. This embodiment collectively learns the weight of sharpening the captured image for all the possible (z, f, d) of the optical system 121. Thus, using the same weight, the CNN sharpens all the captured images having the blurs of various (z, f, d).

This embodiment may provide a reshaping unit configured to reshaping the blurs included in the captured image instead of the sharpener 123b configured to sharpen the captured image. The same applies in the second embodiment described later. In this embodiment, an image processing apparatus (image processor 123) includes an acquiring unit (acquirer 123a) and a generating unit (sharpener 123b or reshaping unit). The acquiring unit is configured to acquire input data including a captured image and optical system information at the time of capturing the captured image. The generating unit is configured to input the input data to a machine learning model, and to generate an estimated image acquired by sharpening the captured image or an image acquired by reshaping the blurs included in the captured image. In this embodiment, an image processing apparatus (learning apparatus 101) includes an acquiring unit (acquirer 112), a generating unit (calculator 113), and an updating unit (updater 114). The acquiring unit is configured to acquire input data including a training image and training optical system information. The generating unit is configured to input the input data to the machine learning model and to generate an output image acquired by sharpening the training image or the output image acquired by reshaping the blurs included in the training image. The updating unit is configured to update a weight of the machine learning model based on the output image and a ground truth image.

This embodiment can provide the image processing apparatus and the image processing system each of which can sharpen the captured image including blurs caused by the optical system with high accuracy while suppressing the learning load of the machine learning model and the amount of the stored data.

Second Embodiment

Next, a description will be given of an image processing system in the second embodiment of the present invention. This embodiment executes the sharpening processing on the captured image, but the present invention may be applied to the reshaping processing on the blurs.

Figure 6:
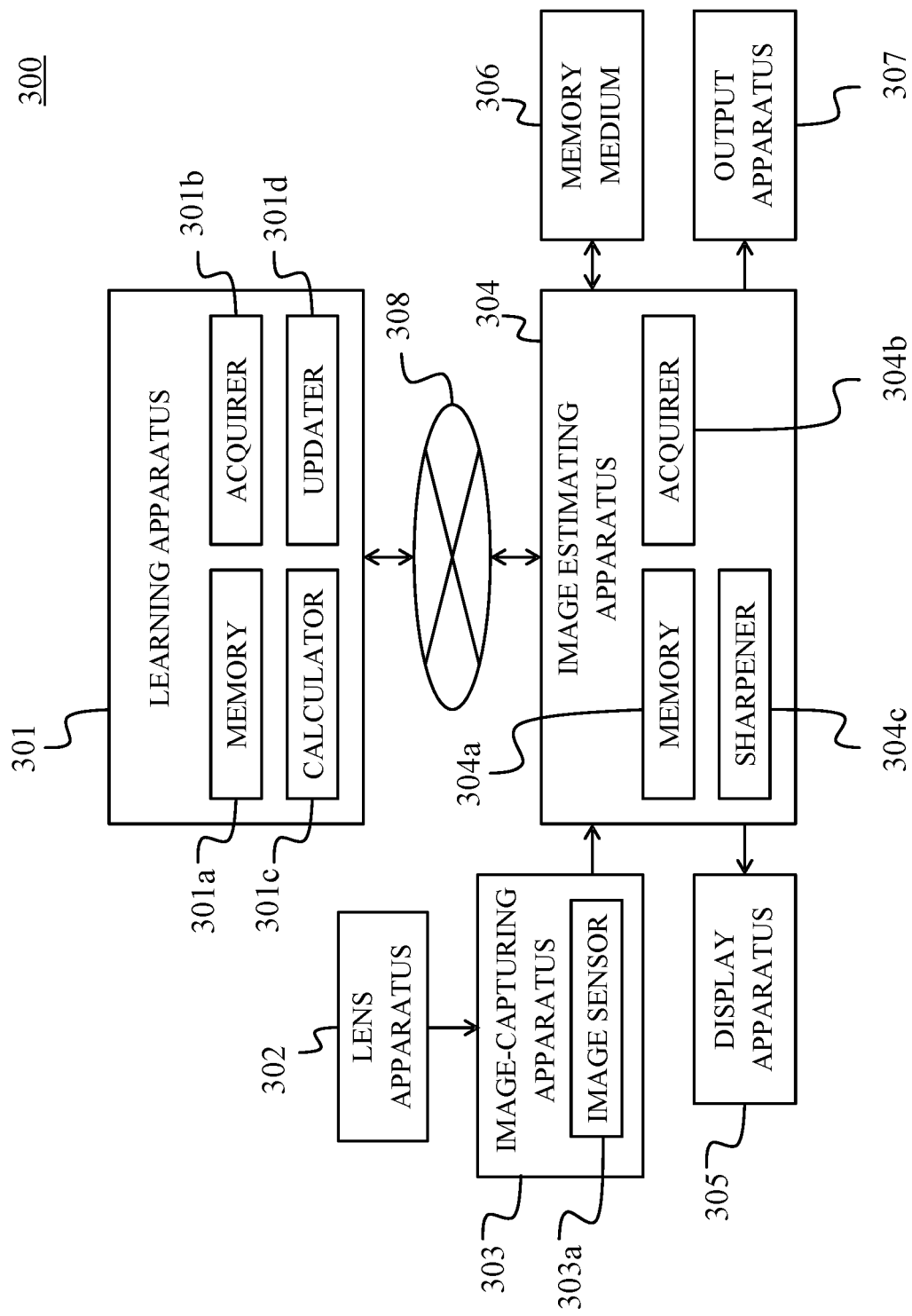
FIG. 6 is a block diagram illustrating an image processing system according to the second embodiment.
Figure 7:
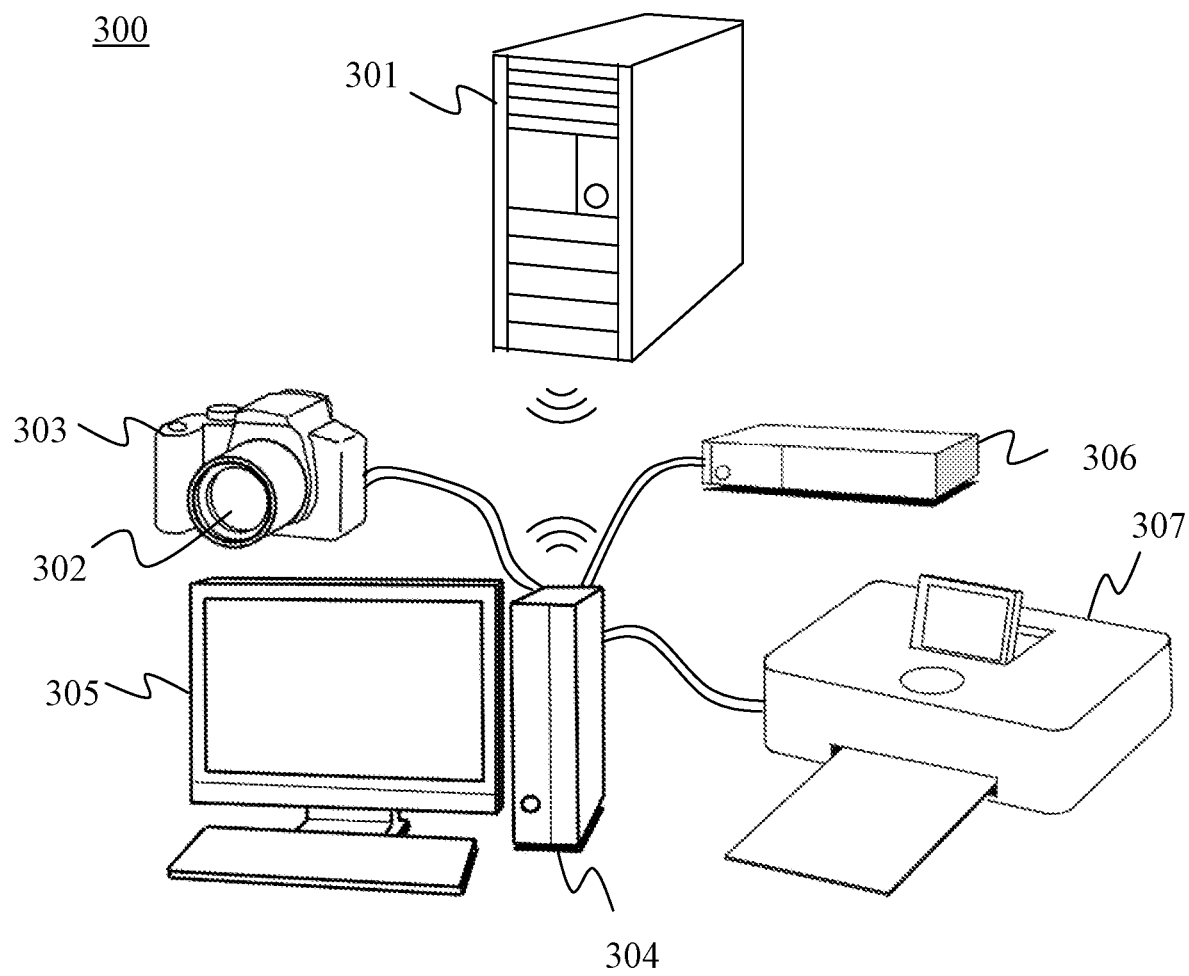
FIG. 7 is an external view illustrating the image processing system according to the second embodiment.

FIG. 6 is a block diagram illustrating an image processing system 300 in this embodiment. FIG. 7 is an external view illustrating the image processing system 300. The image processing system 300 includes a learning apparatus (image processing apparatus) 301, a lens apparatus 302, an image-capturing apparatus 303, an image estimating apparatus (image processing apparatus) 304, a display apparatus 305, a recording medium 306, an output apparatus 307, and a network 308. The learning apparatus 301 includes a memory 301a, an acquirer (acquiring unit) 301b, a calculator (generating unit) 301c, and an updater (updating unit) 301d, and is configured to learn the weight of the machine learning model used for sharpening the captured image. A detailed description will be given later for the weight learning and the sharpening processing of the captured image using the weight.

The lens apparatus 302 and the image-capturing apparatus 303 are detachably attachable, and connectable to different types of each other. The lens apparatus 302 takes different states of the focal length, F-number, and object distance depending on the type. Since the configuration of the lens differs, the lens apparatus 302 generates different shapes of the blurs caused by aberration or diffraction depending on the type. The image-capturing apparatus 303 includes an image sensor 303a. Different types of the image-capturing apparatus differ in the presence or absence and the type of the optical low-pass filter (separation method, cutoff frequency, etc.), a pixel pitch (including pixel aperture), a color filter array, etc.

The image estimating apparatus 304 includes a memory 304a, an acquirer (acquiring unit) 304b, and a sharpener (generating unit) 304c. The image estimating apparatus 304 is configured to generate an estimated image by sharpening the captured image (or at least part thereof) having blurs. The captured image is captured by the image-capturing apparatus 303 and the blurs are caused by the optical system. The image estimating apparatus 304 may be connected to a plurality of combinations of the lens apparatus 302 and the image-capturing apparatus 303. For sharpening the captured image, the learning apparatus 301 uses the machine learning model using the learnt weight. The learning apparatus 301 and the image estimating apparatus 304 are connected via the network 308, and the image estimating apparatus 304 reads out information on the learnt weight from the learning apparatus 301 during or before sharpening the captured image. The estimated image is output to at least one of the display apparatus 305, the recording medium 306, or the output apparatus 307. The display apparatus 305 is, for example, a liquid crystal display or a projector. The user can perform an editing work or the like while checking, via the display apparatus 305, an image being processed. The recording medium 306 is, for example, a semiconductor memory, a hard disk, or a server on a network. The output apparatus 307 is, for example, a printer.

Next, a description will be given of the weight learning (learning phase) performed by the learning apparatus 301 with reference to FIG. 4. This embodiment uses the CNN as the machine learning model, but the present invention can be similarly applied to other models. A description similar to that of the first embodiment will be omitted.

First, in the step S101, the acquirer 301b acquires one or more sets of the ground truth image and the training input data from the memory 301a. The memory 301a stores the training images corresponding to a plurality of the combinations of the lens apparatus 302 and the image-capturing apparatus 303. This embodiment collectively learns the weight of sharpening the captured image for each type of the lens apparatus 302. Thus, this embodiment firstly determines the type of the lens apparatus 302 for learning the weight, and then acquires the training image from a group of the training images corresponding to the type. Each group of the training images corresponding to a certain type of lens apparatus 302 is a group of images each of which has blurs of different states of the zoom, F-number, object distance, image height and azimuth, optical low-pass filter, pixel pitch, color filter array, and the like.

Figure 8:
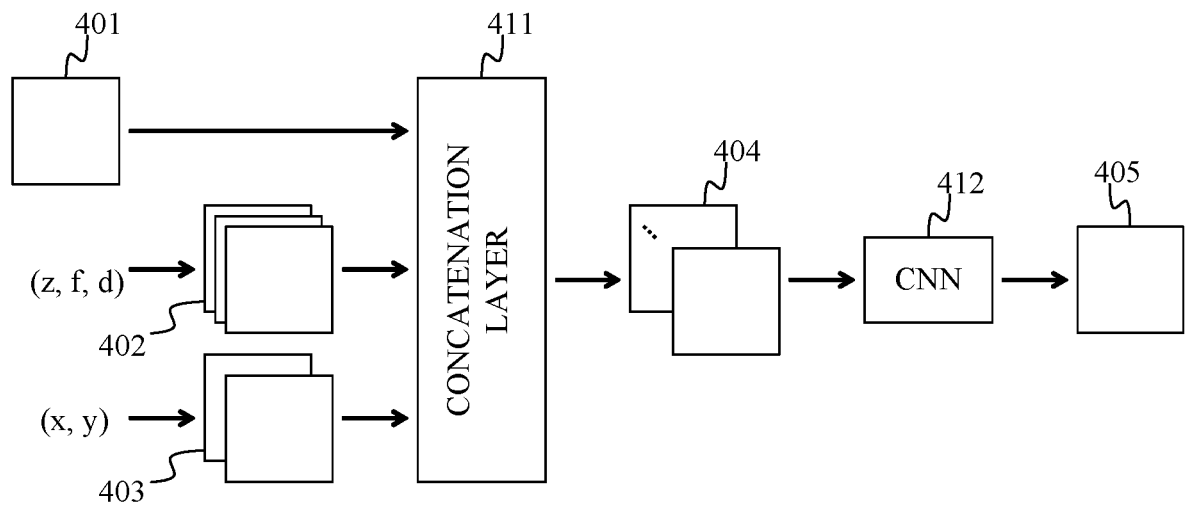
FIG. 8 is a configuration diagram illustrating a machine learning model according to the second embodiment.

This embodiment performs the learning by using the configuration of the CNN given in FIG. 8. FIG. 8 is a configuration diagram illustrating the machine learning model in this embodiment. Training input data 404 includes a training image 401, a state map 402, and a position map 403. This step generates the state map 402 and the position map 403. The state map 402 and the position map 403 are maps respectively indicating (Z, F, D) and (X, Y) corresponding to the blur acting on the acquired training image. (X, Y) are coordinates (horizontal direction and vertical direction) of the image plane illustrated in FIG. 9, and correspond to the image height and azimuth in polar coordinate display.

Figure 9:
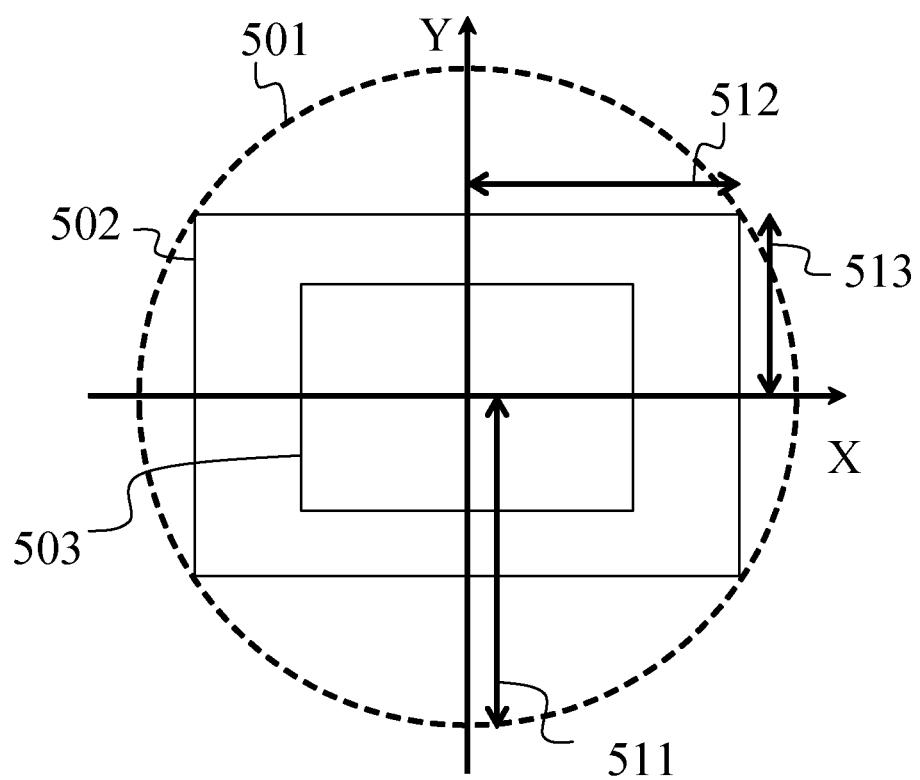
FIG. 9 is a diagram illustrating a relationship between an image sensor and an image circle of an optical system according to the second embodiment.

In this embodiment, the coordinates (X, Y) include the optical axis of the lens apparatus 302 as an origin position. FIG. 9 illustrates a relationship between the image circle 501 of the lens apparatus (optical system) 302, a first effective pixel area 502 and a second effective pixel area 503 of the image sensor 303a, and the coordinates (X, Y). Since the image sensor 303a has a different size depending on the type of the image-capturing apparatus 303, the image-capturing apparatus 303 may have the first effective pixel area 502 or may have the second effective pixel area 503 depending on the type. In all the types of the image-capturing apparatus 303 connectable to the lens apparatus 302, the image-capturing apparatus 303 including the largest image sensor 303a has the first effective pixel area 502.

The position map 403 is generated based on (x, y) acquired by normalizing the coordinates (X, Y). The normalization is performed by dividing (X, Y) by a length (radius of the image circle) 511 based on an image circle 501 of the lens apparatus 302. Alternatively, normalization may be performed by dividing X by a horizontal length 512 of the first effective pixel area from the origin position and by dividing Y by a vertical length 513 of the first effective pixel area from the origin. If (X, Y) is normalized so that the edge of the captured image is always 1, when images are captured by the image sensors 303a of different size, (x, y) having the same value may indicate different position (X, Y), making it complicated the correspondence between the value of (x, y) and the blur. As a result, the accuracy decreases in sharpening the captured image. The position map 403 is a two-channel map having each value of (x, y) as a channel component. Polar coordinates may be used for the position map 403, and the origin position is not limited to FIG. 9.

Figure 10:
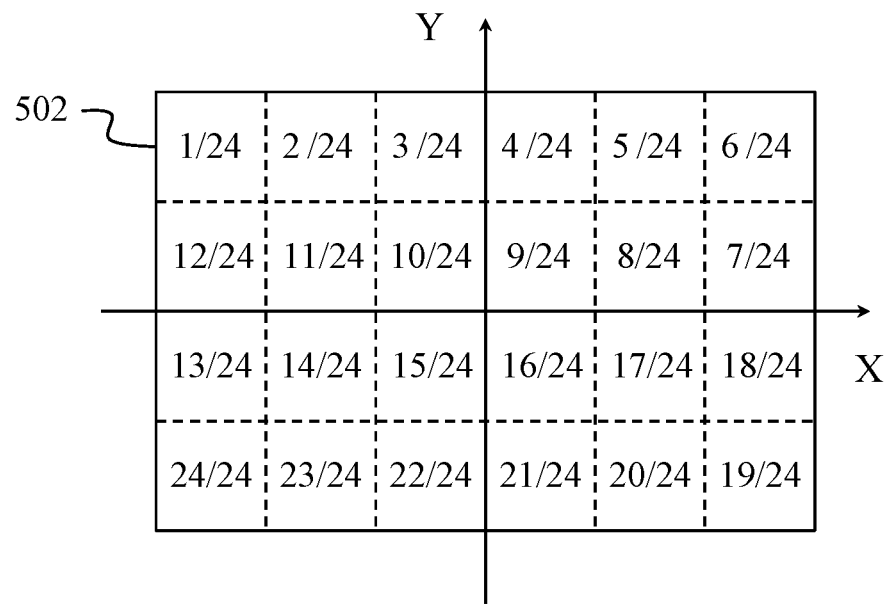
FIG. 10 is a diagram illustrating an example of a position map according to the second embodiment.

The state map 402 is a three-channel map having normalized values (z, f, d) as channel components. Each of the training image 401, the state map 402, and the position map 403 has a same number of elements (number of pixels) per a channel. The configurations of the position map 403 and the state map 402 are not limited to this embodiment. For example, as the position map illustrated in FIG. 10, the first effective pixel area 502 may be divided into a plurality of partial areas, and a numerical value may be assigned to each partial area, so that the position map may be expressed by one channel. The number of the divided partial areas and the method of assigning the numerical values are not limited to those illustrated in FIG. 10. Similarly, (Z, F, D) may be divided into a plurality of partial areas in a three-dimensional space around each axis and may be assigned numerical values, and the state map may be expressed by one channel. A concatenation layer 411 in FIG. 8 concatenates the training image 401, the state map 402, and the position map 403 in the channel direction in a predetermined order, and generates the training input data 404.

Subsequently in the step S102 of FIG. 4, the calculator 301c inputs the training input data 404 to a CNN 412, and generates an output image 405. Subsequently in the step S103, the updater 301d updates the weight of the CNN from the error between the output image and the ground truth image. Subsequently in the step S104, the updater 301d determines whether the learning has been completed. The information on the learnt weight is stored on the memory 301a.

Figure 11:
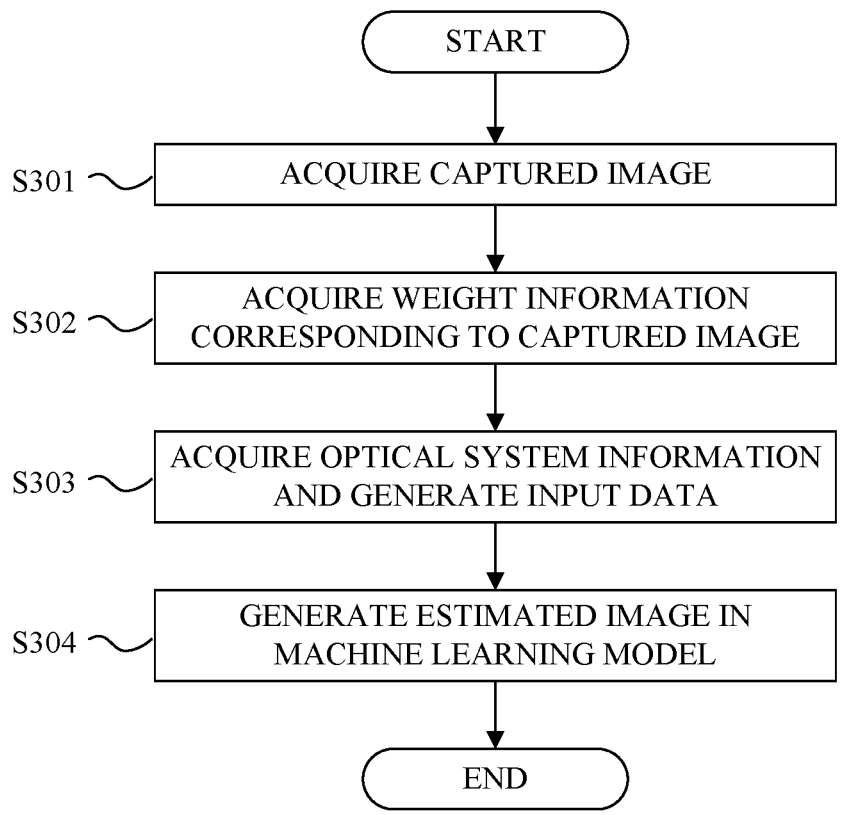
FIG. 11 is a flowchart relating to generation of an estimated image according to the second embodiment.

Next, with reference to FIG. 11, a description will be given of the sharpening of the captured image (estimating phase) performed by the image estimating apparatus 304. FIG. 11 is a flowchart relating to the sharpening of the captured image (generation of the estimated image). Each step in FIG. 11 is mainly executed by the acquirer 304b or the sharpener 304c of the image estimating apparatus 304.

First in the step S301, the acquirer 304b acquires the captured image (or at least part thereof). Subsequently in the step S302, the acquirer 304b acquires weight information corresponding to the captured image. In the second embodiment, the weight information for each type of the lens apparatus 302 has been read from the memory 301a and stored on the memory 304a, in advance. The acquirer 304b acquires, from the memory 304a, the weight information corresponding to the type of the lens apparatus 302 used for capturing the captured image. The type of the lens apparatus 302 used for the capturing is specified from, for example, metadata in a captured image file.

Subsequently in the step S303, the acquirer 304b generates the state map and the position map based on the captured image, and generates input data. The state map is generated based on the number of pixels of the captured image and information on the state (Z, F, D) of the lens apparatus 302 at the time of capturing the captured image. The state map has the same number of elements (number of pixels) per channel as that of the captured image. (Z, F, D) is specified from, for example, the metadata of the captured image. The position map is generated based on the number of pixels of the captured image and the position information regarding each pixel of the captured image. The position map has the same number of elements (number of pixels) per channel as that of the captured image. A normalized position map is generated by specifying the size of the effective pixel area of the image sensor 303a used for capturing the captured image using the metadata of the captured image, etc., and by performing the normalization on the position map using, for example, the length of the image circle of lens apparatus 302 similarly specified using the meta data, etc. The input data is generated by concatenating the captured image, the state map, and the position map in a predetermined order in the channel direction, similarly as illustrated in FIG. 8. In this embodiment, the order of the step S302 and the step S303 does not matter. The state map and the position map may be generated at the time of capturing the captured image, and may be stored together with the captured image.

Figure 12:
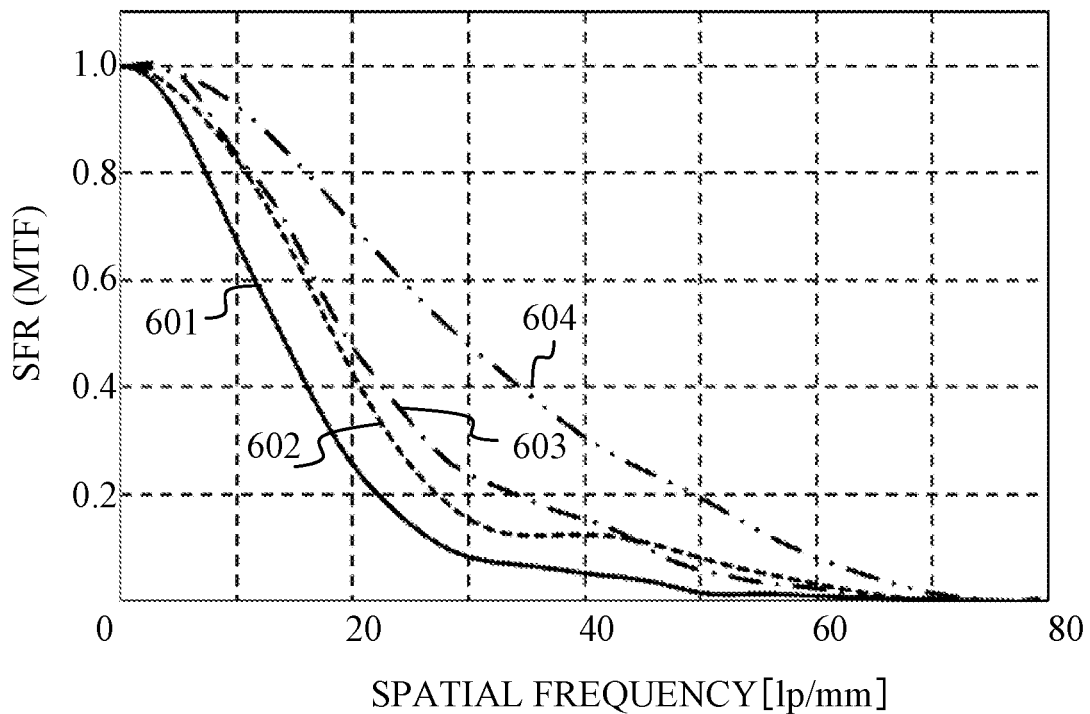
FIG. 12 is a diagram illustrating an effect of sharpening the captured image according to the second embodiment.

Subsequently in the step S304, the sharpener 304c inputs the input data to the CNN similarly as illustrated in FIG. 8, and generates the estimated image. FIG. 12 is a diagram describing the effect of sharpening the captured image, and indicates the effect of sharpening the captured image in 90% of the image height of a certain zoom lens at specific (Z, F, D). In FIG. 12, a horizontal axis indicates the spatial frequency, and a vertical axis indicates a measured value of an SFR (Spatial Frequency Response). The SFR corresponds to an MTF (Modulation Transfer Function) in a certain cross section. A Nyquist frequency of the image sensor used for the capturing is 76 [lp/mm]. A solid line 601 represents the captured image, and a broken line 602, a one-dot chain line 603, and a two-dot chain line 604 represent the sharpened captured images (sharpened images) from the CNN. The sharpened images represented by the broken line 602, one-dot chain line 603, and two-dotted chain line 604 are acquired by the CNN that has learnt the sharpening of the captured image using the learning data acquired by mixing all the blurs generated by the aberrations and diffraction of the zoom lens.

The broken line 602 represents the sharpened image acquired by only using the captured image (or the training image) as the input data in the estimating phase (or the learning phase). The one-dot chain line 603 represents the sharpened image acquired by using, as the input data, the captured image (or the training image) and the position map. The two-dot chain line 604 represents the sharpened image acquired by using, as the input data, the captured image (or the training image), the position map, and the state map, the input data having the same configuration as that of this embodiment. The CNN used for acquiring each sharpened image represented by the broken line 602, the one-dot chain line 603, and the two-dot chain line 604 is different only in the number of channels of the first layer filter (because the number of channels of input data is different), and is the same in the filter size, the number of filters, the number of layers, and the like. Thus, the learning loads and the amounts of the stored data (the data capacity of the weight information of the CNN) are substantially the same in acquiring the sharpened images represented by the broken line 602, the one-dot chain line 603, and the two-dot chain line 604. In FIG. 12, it is indicated that the configuration of this embodiment has a high sharpening effect as represented by the two-dot chain line 604.

This embodiment can provide the image processing apparatus and the image processing system each of which can sharpen the captured image having the blurs caused by the optical system used with high accuracy while suppressing the learning load and the amount of the stored data in the machine learning model.

Next, a description will be given of conditions that may enhance the effect of this embodiment.

The input data may further include information indicating the presence or absence and the type of the optical low-pass filter of the image-capturing apparatus 303 used for capturing the captured image. This may improve the effect of sharpening the captured image. The optical low-pass filter has different separation method (vertical two-point separation, horizontal two-point separation, four-point separation, etc.) and cutoff frequency depending on the type. A map having a numerical value that can specify the presence or absence and the type may be generated based on the number of pixels of the captured image and may be included in the input data.

Figure 13:
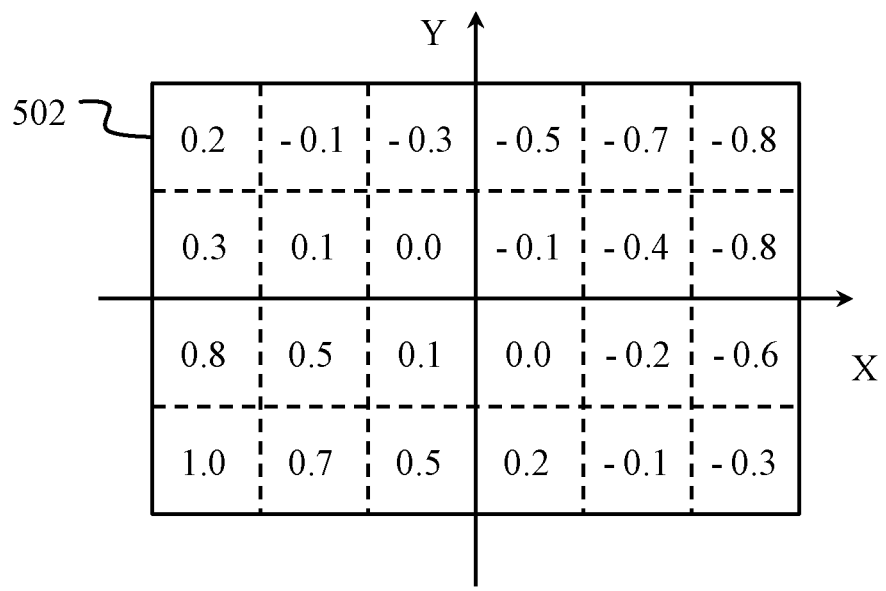
FIG. 13 is a diagram illustrating an example of a manufacturing variation map according to the second embodiment.

The input data may further include information on a manufacturing variation of the lens apparatus 302 used for capturing the captured image. From this, it may be possible to accurately sharpen an image with blurs due to the manufacturing variation. In the learning phase, the training image may be generated by applying the blurs including blurs due to the manufacturing variation to the original image, and the machine learning model may learn the training input data including the information indicating the manufacturing variation. The information indicating the manufacturing variation, for example, may be a numerical value representing a degree of an actual performance including the manufacturing variation with respect to a designed performance. For example, when the actual performance is equal to the designed performance, the numerical value is set to 0, and the numerical value changes in a negative direction when the actual performance is inferior to the designed performance, and the numerical value changes in a positive direction when the actual performance is superior to the designed performance. In the estimating phase, as illustrated in FIG. 13, for a plurality of partial areas in the captured image (or for each pixel), the input data may include a map (manufacturing variation map) having the numerical value representing the degree of the actual performance with respect to the designed performance. FIG. 13 is a diagram illustrating an example of the manufacturing variation map. The manufacturing variation map is generated based on the number of pixels of the captured image. The manufacturing variation map can be acquired by measuring the actual performance including the manufacturing error of the lens apparatus 302 when, for example, the lens apparatus 302 is manufactured. The manufacturing variations may be classified into several categories, such as a performance degradation of the entire image (deterioration of spherical aberration) and a performance variation due to the azimuth (one-side defocusing), and the manufacturing variations may be indicated by a numerical value representing the categories.

The input data may further include distribution information regarding the distance in the object space at the time of capturing the captured image. From this, it may be possible to accurately sharpen an image with blurs caused by a performance variation due to the defocus. Due to an axial chromatic aberration and a field curvature, a defocused object plane may result in better optical performance than that of a focal plane. If this is not taken into account and the captured image is sharpen using the machine learning model that has only learnt the blurs on the focal plane, a perceived resolution may be excessive and an unnatural image may be obtained. Thus, firstly in the learning phase, the learning may be performed using the training image in which a defocus blur is applied to the original image. At this time, the training input data also includes a numerical value representing the defocus amount (corresponding to the distance in the object space). For example, the focal plane is set to 0, and the far direction is set to the negative direction and the close direction is set to the positive direction from the image-capturing apparatus. In the estimating phase, a defocus map of the captured image (indicating information on the distribution of the distance in the object space) may be acquired by capturing a parallax image, using a DFD (Depth from Defocus), or the like, and may be included in the input data. The defocus map may be generated based on the number of pixels of the captured image.

The input data may further include information on a pixel pitch or the color filter array of the image sensor 303a used for capturing the captured image. From this, it may be possible to accurately sharpen an image with blurs regardless of the type of the image sensor 303a. The intensity of the pixel aperture deterioration and the size of the blurs for each pixel vary depending on the pixel pitch. The blur shapes vary depending on the color components constituting the color filter array. The color components are, for example, RGB (Red, Green, Blue) and complementary CMY (Cyan, Magenta, Yellow). When the training image and the captured image are undeveloped Bayer images or the like, the shapes of the blurs differ even in the pixels at the same position depending on the arrangement order of the color filter array. In the learning phase, the training input data may include information for specifying the pixel pitch and the color filter array corresponding to that of the training image. For example, the training input data includes a map having, as an element, a normalized numerical value of the pixel pitch. The normalization may use, as a divisor, the largest pixel pitch in those of a plurality of types of image-capturing apparatus 303. The training input data may include a map (color map) having, as the elements, numerical values representing the color components of the color filter array. In the estimating phase, the sharpening accuracy may be improved by including the color map in the input data. The color map may be generated based on the number of pixels of the captured image.

The input data may further include information (accessory information) indicating the presence or absence and the type of an accessory of the lens apparatus 302. The accessory is, for example, a wide converter, teleconverter, close-up lens, wavelength cut filter, and the like. Because the shapes of the blurs vary depending on the type of the accessory, when the input data includes the accessory information, it may be possible to sharpen the image including the influence of the accessory. In the learning phase, the blurs applied to the training image may include the influence of the accessory, and the training input data may include information specifying the accessory, for example, a map (accessory map) having, as elements, numerical values representing the presence or absence and the type of the accessory. In the estimating phase, the input data may include the accessory information (map). The accessory map may be generated based on the number of pixels of the captured image.

Third Embodiment

Next, a description will be given of an image processing system according to the third embodiment of the present invention. This embodiment executes the reshaping processing for the blurs, but the present invention can be similarly applied to the sharpening processing for the captured image.

Figure 14:
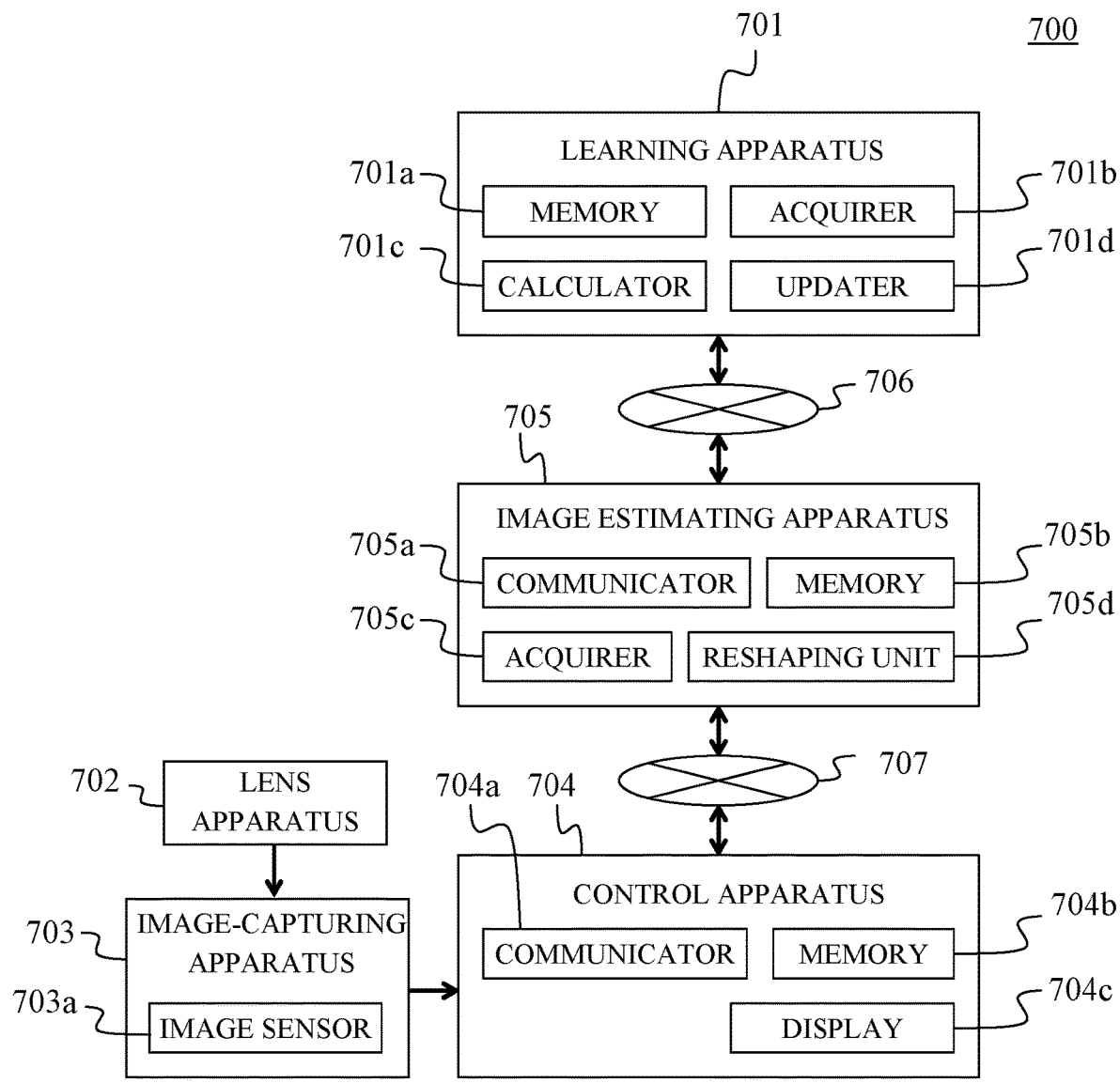
FIG. 14 is a block diagram illustrating an image processing system according to a third embodiment.
Figure 15:
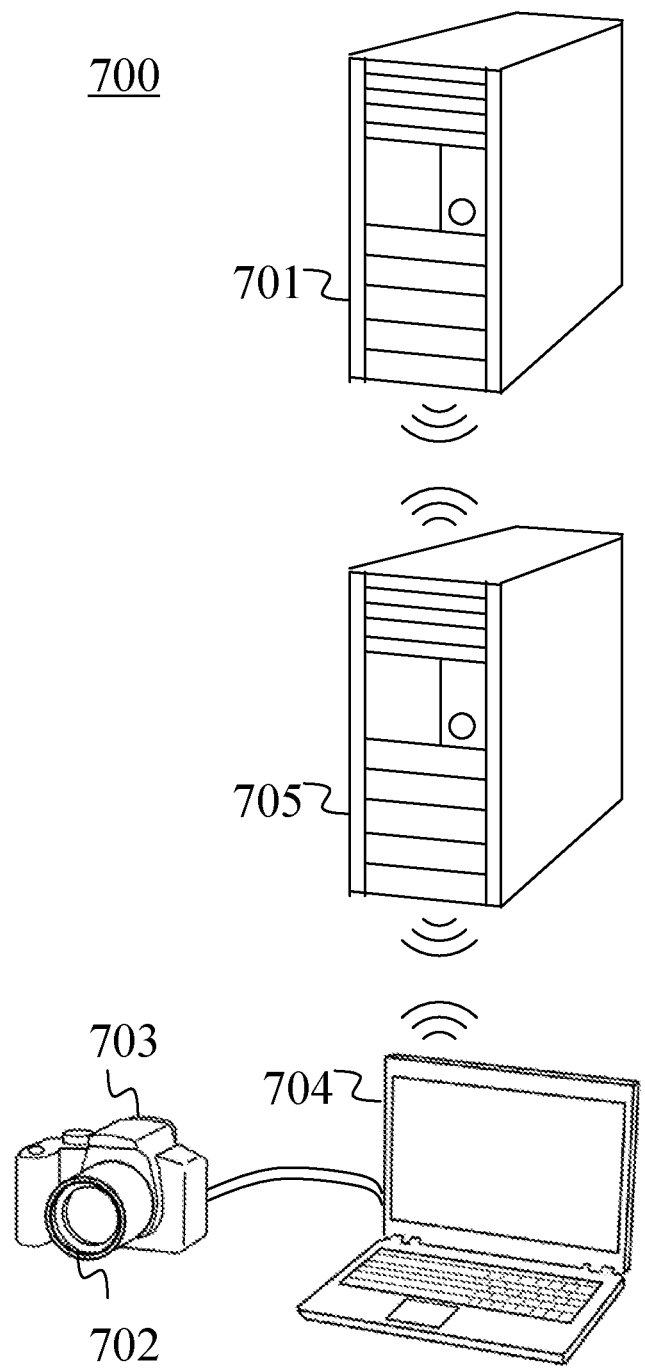
FIG. 15 is an external view illustrating the image processing system according to the third embodiment.

FIG. 14 is a block diagram illustrating an image processing system 700. FIG. 15 is an external view illustrating the image processing system 700. The image processing system 700 includes a learning apparatus 701, a lens apparatus (optical system) 702, an image-capturing apparatus 703, a control apparatus (first apparatus) 704, an image estimating apparatus (second apparatus) 705, and networks 706 and 707. The learning apparatus 701 and the image estimating apparatus 705 are, for example, servers. The control apparatus 704 is an apparatus operated by the user, such as a personal computer or a mobile terminal. The learning apparatus 701 includes a memory 701a, an acquirer (acquiring unit) 701b, a calculator (generating unit) 701c, and an updater (updating unit) 701d and is configured to learn the weight of the machine learning model for reshaping the blurs of the captured image captured using the lens apparatus 702 and the image-capturing apparatus 703. A detailed description will be given later regarding the learning. In this embodiment, the blurs to be reshaped are caused by the defocus, but the present invention can be similarly applied to the aberration and diffraction.

The image-capturing apparatus 703 includes an image sensor 703a. The image sensor 703a is configured to photoelectrically convert the optical image formed by the lens apparatus 702 and acquire the captured image. The lens apparatus 702 and the image-capturing apparatus 703 are detachably attachable, and combinable to a plurality of types each other. The control apparatus 704 includes a communicator 704a, a memory 704b, and a display 704c, and is configured to control processing to be performed on the captured image acquired from a wired or wirelessly connected image-capturing apparatus 703 according to user's operation. Alternatively, the control apparatus 704 may have stored the captured image captured by the image-capturing apparatus 703 on the memory 704b in advance, and may read out the captured image.

The image estimating apparatus 705 includes a communicator 705a, a memory 705b, an acquirer (acquiring unit) 705c, and a reshaping unit (generating unit) 705d. The image estimating apparatus 705 is configured to execute the reshaping processing on the captured image in response to a request from the control apparatus 704 connected via the network 707. The image estimating apparatus 705 is configured to acquire the information of the learnt weight from the learning apparatus 701 connected via the network 706 during or before reshaping the blurs, and to use the information for reshaping the blurs in the captured image. The estimated image after reshaping the blurs is transmitted to the control apparatus 704 again, stored on the memory 704b, and displayed on the display 704c.

Figure 16:
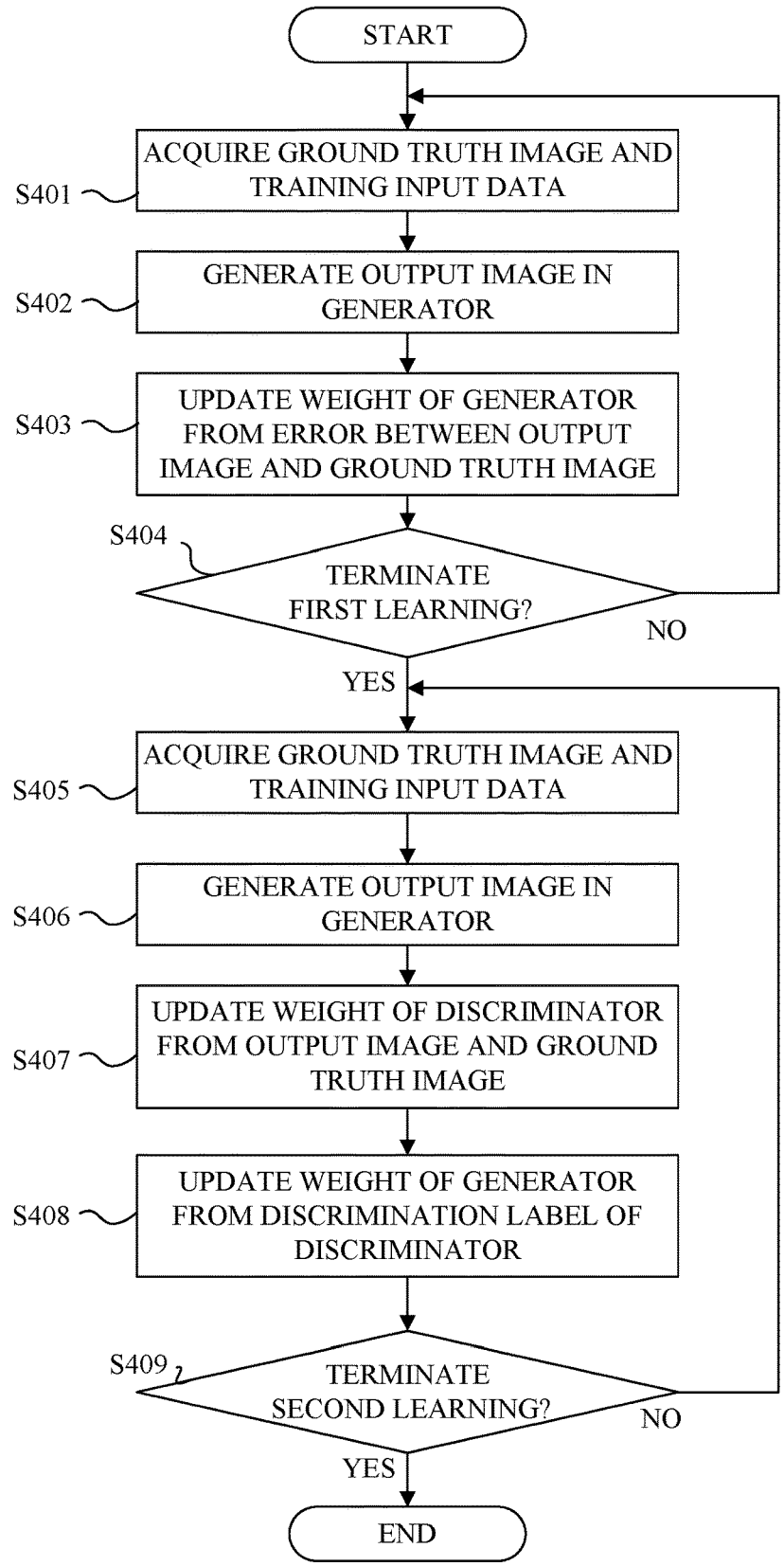
FIG. 16 is a flowchart relating to weight learning according to the third embodiment.

Next, a description will be given of the weight learning (learning phase, a method of manufacturing a learnt model) executed by the learning apparatus 701 in this embodiment with reference to FIG. 16. FIG. 16 is a flowchart relating to the weight learning. Each step in FIG. 16 is mainly executed by the acquirer 701b, the calculator 701c, or the updater 701d of the learning apparatus 701. This embodiment uses the GAN as the machine learning model, but the present invention can be similarly applied to other models. The GAN includes a generator configured to generate an output image with the reshaped defocused blurs, and a discriminator configured to discriminate between the ground truth image and the output image generated by the generator. In the learning, first learning only using the generator is performed as the learning described in the first embodiment, and then second learning using the generator and the discriminator is performed when the weight of the generating unit has converged to some extent. Hereinafter, a description of the same parts as described in the first embodiment will be omitted.

First in the step S401, the acquirer 701b acquires one or more sets of the ground truth image and the training input data from the memory 701a. In this embodiment, the ground truth image and the training image are a pair of images having different defocus blur shapes. The training image is an image on which the defocus blurs to be reshaped is applied. For example, the blurs to be reshaped include double-line blurs, chipping due to vignetting, ring-shaped blurs due to pupil occlusion of a catadioptric lens, annular patterns caused by unevenly shaving a mold of the aspherical lens, etc. The ground truth image is an image to which defocus blur after reshaping the blurs has acted. The defocus blur shape after reshaping the blurs may be determined according to user's preference, such as a Gaussian or a disk (circular distribution with flat intensity). In the third embodiment, the memory 701a stores a plurality of the training images and the ground truth images generated by applying blurs to the original image. The plurality of the training images and ground truth images are generated by applying blurs of various defocus amounts so that the accuracy in reshaping the blurs can be ensured for various defocus amounts. Because the image may not change before and after reshaping the blurs on the focal plane, the training image having zero defocus amount and the corresponding ground truth image are also generated.

This embodiment collectively learns weights of reshaping the blurs for the plurality of types of lens apparatus 702. Thus, the optical system information includes information for specifying the type of the lens apparatus 702. The memory 701a provides the training image having the blurs corresponding to the type of the lens apparatus 702 to be collectively learnt. The optical system information further includes information for specifying the states of the zoom, F-number, and object distance of the lens apparatus 702 corresponding to the blurs acting on the training image.

Figure 17:
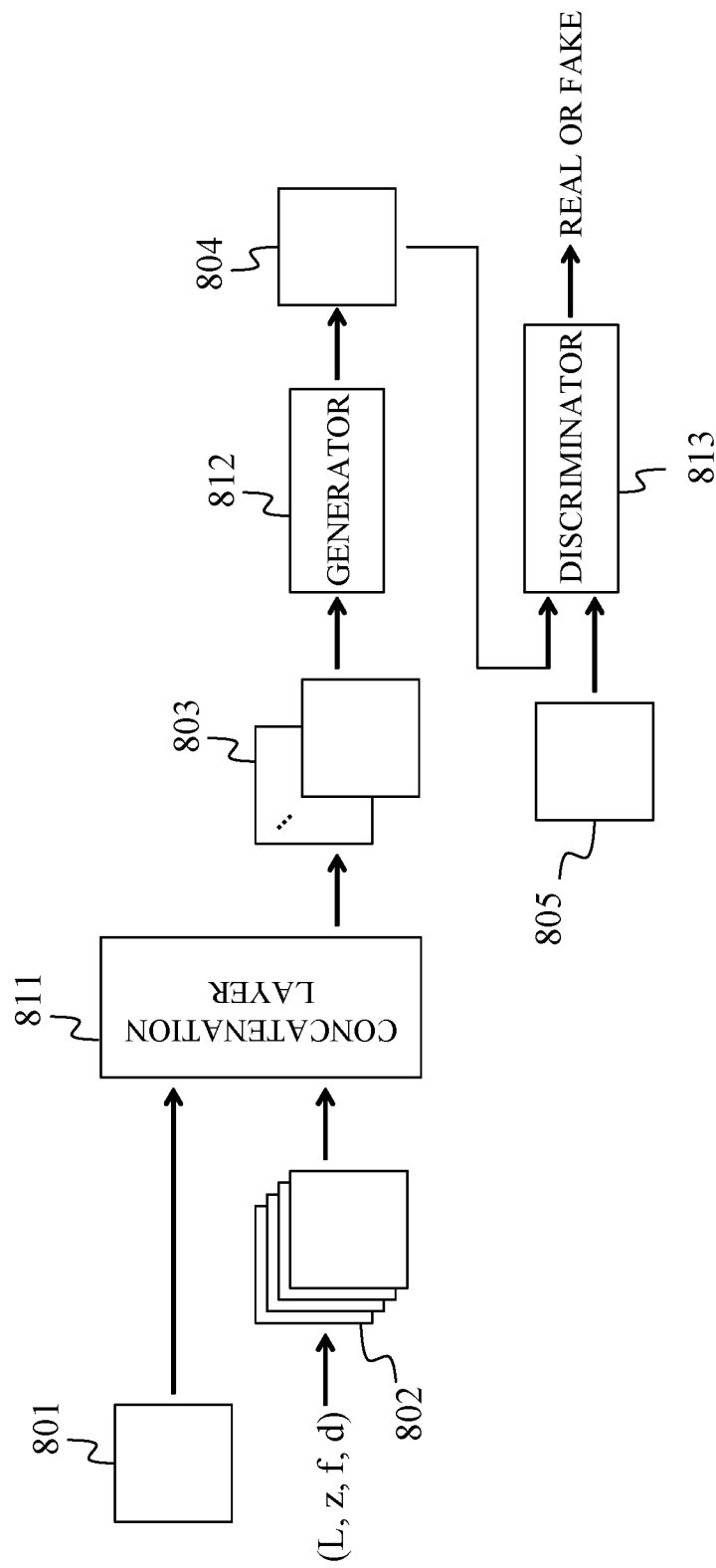
FIG. 17 is a configuration diagram illustrating a machine learning model according to the third embodiment.

FIG. 17 is a configuration diagram illustrating the machine learning model (GAN). A lens state map 802 is generated based on the number of pixels of a training image 801. The lens state map 802 includes, as the channel components, numerical values (L, z, f, d) for specifying the type and the states of the zoom, F-number, and object distance of the lens apparatus 702, respectively. The concatenation layer 811 concatenates the training image 801 and the lens state map 802 in the channel direction in a predetermined order, and generates training input data 803.

Subsequently in the step S402 of FIG. 16, the calculator 701c inputs the training input data 803 to a generator 812, and generates an output image 804. The generator 812 is, for example, the CNN. Subsequently in the step S403, the updater 701d updates the weight of the generator 812 from the error between the output image 804 and the ground truth image 805. The Euclidean norm of the difference at each pixel is used for the loss function.

Subsequently in the step S404, the updater 701d determines whether the first learning has been completed. When the first learning has not been completed, the process returns to the step S401. On the other hand, when the first learning has been completed, the process proceeds to the step S405, and the updater 701d executes the second learning.

In the step S405, the acquirer 701b acquires one or more sets of a ground truth image 805 and training input data 803 from the memory 701a as described in the step S401. Subsequently in the step S406, the calculator 701c inputs the training input data 803 to the generator 812 and generates the output image 804, as described in the step S402. Subsequently in the step S407, the updater 701d updates the weight of the discriminator 813 from the output image 804 and the ground truth image 805. The discriminator 813 determines whether the input image is a fake image generated by the generator 812 or a real image that is the ground truth image 805. The output image 804 or the ground truth image 805 is input to the discriminator 813, and a discrimination label (fake or real) is generated. The updater 701d updates the weight of the discriminator 813 based on the error between the discrimination label and a ground truth label (the output image 804 is fake and the ground truth image 805 is real). This embodiment uses a sigmoid cross entropy as the loss function, but the present invention may use other loss function.

Subsequently in the step S408, the updater 701d updates the weight of the generator 812 from the output image 804 and the ground truth image 805. The loss function is a weighted sum of the Euclidean norm of the step S403 and the following two items. The first item is called Content Los, which is acquired by converting the output image 804 and the ground truth image 805 into the feature map, and taking the Euclidean norm of the difference for each element. By adding the difference in the feature map to the loss function, the more abstract nature of the output image 804 can be made closer to the ground truth image 805. The second item is called Adversarial Loss, which is the sigmoid cross entropy of the discrimination label acquired by inputting the output image 804 to the discriminator 813. As the discriminator 813 learns to recognize the object as the real, the output image 804 that looks more like the ground truth image 805 can be obtained.

Subsequently in the step S409, the updater 701d determines whether the second learning has been completed. As described in the step S404, if the second learning has not been completed, the process returns to the step S405. On the other hand, when the second learning has been completed, the updater 701d stores the learnt weight information of the generator 812 in the memory 701a.

Figure 18:
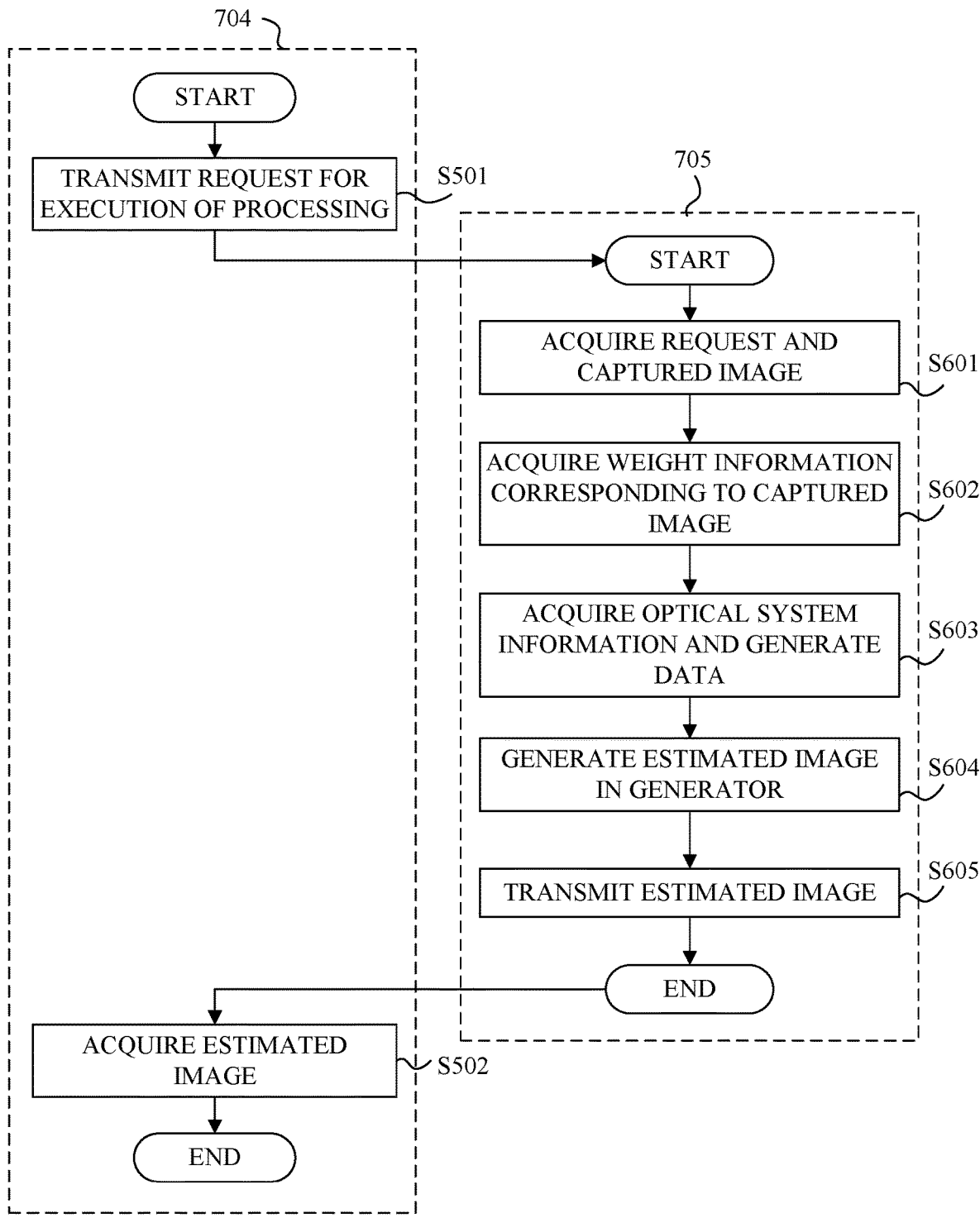
FIG. 18 is a flowchart relating to generation of an estimated image according to the third embodiment.

Next, a description will be given of reshaping the blurs (estimating phase) executed by the control apparatus 704 and the image estimating apparatus 705 with reference to FIG. 18. FIG. 18 is a flowchart relating to the reshaping of the blurs (generation of the estimated image). Each step in FIG. 18 is mainly executed by each unit of the control apparatus 704 or the image estimating apparatus 705.

First in the step S501, the communicator 704a of the control apparatus 704 transmits the captured image and a request (processing request) for the execution of the reshaping processing for the blurs to the image estimating apparatus 705. Subsequently in the step S601, the communicator 705a of the image estimating apparatus 705 receives and acquires the captured image and the processing request transmitted from the control apparatus 704. Subsequently in the step S602, the acquirer 705c of the image estimating apparatus 705 acquires the information on the learnt weight corresponding to the captured image from the memory 705b. Weight information has been read out from the memory 701a and stored on the memory 705b in advance.

Subsequently in the step S603, the acquirer 705c acquires the optical system information of the captured image and generates the input data. From the metadata of the captured image, the acquirer 705c acquires information specifying the type of the lens apparatus (optical system) 702 and its states of the zoom, F-number and object distance at the time of capturing the captured image, and generates a lens state map as described in FIG. 17. The input data is generated by concatenating the captured image and the lens state map in the channel direction in a predetermined order. This embodiment can concatenate the captured image or the feature map based on the captured image and the state map in the channel direction before or during the input to the machine learning model.

Subsequently in the step S604, the reshaping unit 705d inputs the input data to the generator, and generates the estimated image having the reshaped blur. The generator uses the weight information. Subsequently in the step S605, the communicator 705a transmits the estimated image to the control apparatus 704. Subsequently in the step S502, the communicator 704*a* of the control apparatus 704 acquires the estimated image transmitted from the image estimating apparatus 705.

This embodiment may provide a sharpener configured to sharpen the captured image instead of the reshaping unit 705*d* that reshapes the blur included in the captured image. In this embodiment, the image processing system 700 includes a first apparatus (control apparatus 704) and a second apparatus (image estimating apparatus 705) that can communicate with each other. The first apparatus includes a transmitting unit (communicator 704*a*) configured to transmit, to the second apparatus, the request for execution of processing on a captured image. The second apparatus includes a receiving unit (communicator 705*a*), an acquiring unit (acquirer 705*c*), and a generating unit (reshaping unit 705*d* or sharpener). The receiving unit is configured to receive the request. The acquiring unit is configured to acquire input data including the captured image and optical system information at the time of capturing the captured image. The generating unit is configured to input the input data to a machine learning model based on the request, and to generate an estimated image by sharpening the captured image or by reshaping the blurs included in the captured image.

This embodiment can provide the image processing apparatus and the image processing system each of which can reshape the blurs caused by the optical system of the captured image with high accuracy while suppressing the learning load of the machine learning model and the amount of stored data.

This embodiment has described the example in which the communicator 704*a* of the control apparatus 704 transmits the captured image together with the processing request on the captured image to the image estimating apparatus 705 in the step S501, but the control apparatus 704 do not necessarily transmit the captured image. For example, the control apparatus may only transmit the processing request on the captured image to the image estimating apparatus 705, and the image estimating apparatus 705, in response to the request, may be configured to acquire the captured image corresponding to the request from another image storage server or the like.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the embodiments, the present invention can provide an image processing method, an image processing apparatus, an image processing system, and a manufacturing method of learnt weight each of which highly accurately sharpens a captured image or reshapes blurs in the captured image while suppressing a learning load and an amount of stored data of a machine learning model.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-105850, filed on Jun. 6, 2019 which is hereby incorporated by reference herein in its entirety.

What is claimed is:

1. An image processing method comprising:
   acquiring input data including a captured image and first information indicating a state of an optical system at a time of capturing the captured image, the optical system having been used for capturing the captured image; and
   generating an estimated image by inputting the input data to a machine learning model,
   wherein the estimated image is generated by sharpening the captured image or by reshaping blurs included in the captured image,
   wherein the machine learning model generates different estimated images depending on the first information, and
   wherein the state of the optical system includes at least one of states of a zoom, F-number, and distance from the optical system to an in-focus object.

2. The image processing method according to claim 1, wherein generating the estimated image uses the machine learning model for a first captured image captured in a first state of the optical system and for a second captured image captured in a second state of the optical system that is different from the first state.

3. The image processing method according to claim 1, wherein the first information includes a numerical value indicating at least one of states of a zoom, Fnumber, and distance from the optical system to an in-focus object, and
   wherein the numerical value is normalized based on a range that is set in the optical system for the at least one of the states of the zoom, the F-number, and the object distance.

4. The image processing method according to claim 1, wherein the input data includes a state map indicating the state of the optical system, and
   wherein the state map is generated based on the number of pixels of the captured image and the first information.

5. The image processing method according to claim 4, wherein each element of a same channel in the state map is a same numerical value.

6. The image processing method according to claim 1, wherein the input data further includes second information relating to a position of each pixel of the captured image.

7. The image processing method according to claim 6, wherein the second information includes a numerical value normalized by a length based on an image circle of the optical system.

8. The image processing method according to claim 1, wherein the first information includes information on a type of the optical system.

9. The image processing method according to claim 1, wherein the first information includes information on presence or absence of an optical low-pass filter, or a type of the optical low-pass filter.

10. The image processing method according to claim 1, wherein the first
information includes information on presence or absence of an accessory of the optical system or a type of the accessory.

11. The image processing method according to claim 1, wherein the input data further includes information on a distribution of distance to an object space at the time of capturing the captured image.

12. The image processing method according to claim 1, wherein the input data includes information on a pixel pitch or a color filter array of an image sensor used for capturing the captured image.

13. The image processing method according to claim 1, wherein the input data is obtained by concatenating the captured image and a map generated based on the first information in a channel direction.

14. A non-transitory computer-readable storage medium storing a computer program that causes a computer to execute the image processing method according to claim 1.

15. An image processing apparatus comprising:
a memory storing instructions; and
at least one processor or circuit that executes the instructions to:
acquire input data including a captured image and first information indicating a state of an optical system at a time of capturing the captured image, the optical system having been used for capturing the captured image; and
generate an estimated image by inputting the input data to a machine learning model,
wherein the estimated image is generated by sharpening the captured image or by reshaping blurs included in the captured image,
wherein the machine learning model generates different estimated images depending on the first information, and
wherein the state of the optical system includes at least one of states of a zoom, F-number, and distance from the optical system to an in-focus object.

16. An image processing system having the image processing
apparatus according to claim 15 and a control apparatus,
wherein the control apparatus includes a memory storing instructions, and at least one processor or circuit that executes the instructions to transmit, to the image processing apparatus, a request relating to an execution of processing on the captured image.

17. An image processing method comprising:
acquiring input data including a training image and first information indicating a state of an optical system corresponding to the training image;
generating an output image by inputting the input data to a machine learning model; and
updating the machine learning model based on the output image and a ground truth image,
wherein the output image is generated by sharpening the training
image or by reshaping blurs included in the training image,
wherein the machine learning model generates different output images depending on the first information, and
wherein the state of the optical system includes at least one of states of a zoom, F-number, and distance from the optical system to an in-focus object.

18. A non-transitory computer-readable storage medium storing a computer program that causes a computer to execute the image processing method according to claim 17.

19. A generating method of learnt machine learning model comprising:
acquiring input data including a training image and first information relating to indicating a state of an optical system corresponding to the training image;
generating an output image by inputting the input data to a machine learning model; and
updating the machine learning model based on the output image and a ground truth image,
wherein the output image is generated by sharpening the training image or by reshaping blurs included in the training image, and
wherein the machine learning model generates different estimated images depending on the first information, and
wherein the state of the optical system includes at least one of states of a zoom, F-number, and distance from the optical system to an in-focus object.

20. An image processing apparatus comprising:
a memory storing instructions; and
at least one processor or circuit that executes the instructions to:
acquire input data including a training image and first information indicating a state of an optical system corresponding to the training image;
input the input data to a machine learning model and
generate an output image by inputting the input data to a machine learning model; and update the machine learning model based on the output image and a ground truth image,
wherein the output image is generated by sharpening the training image or by reshaping blurs included in the training image,
wherein the machine learning model generates different estimated images depending on the first information, and
wherein the state of the optical system includes at least one of states of a zoom, F-number, and distance from the optical system to an in-focus object.

21. The image processing method according to claim 1, further comprising acquiring weight information of the machine learning model, and
wherein generating the estimated image generates the estimated image by inputting data to the machine learning model that is based on the weight information.

22. The image processing method according to claim 21, wherein the machine learning model is a neural network.

23. The image processing method according to claim 21,
wherein the machine learning model has been subjected to learning in advance, and
wherein the learning uses training input data including a training image and information indicating a state of an optical system corresponding to the training image, and is performed so that different processing is performed according to the first information.

24. The image processing method according to claim 1, wherein the estimated image is generated by inputting the input data directly to the machine learning model.

* * * * *